United States Patent
Kitaura et al.

(10) Patent No.: US 11,176,701 B2
(45) Date of Patent: Nov. 16, 2021

(54) POSITION ESTIMATION SYSTEM AND POSITION ESTIMATION METHOD

(71) Applicant: FUJITSU LIMITED, Kawasaki (JP)

(72) Inventors: Asako Kitaura, Kawasaki (JP); Takushi Fujita, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 16/662,106

(22) Filed: Oct. 24, 2019

(65) Prior Publication Data

US 2020/0134866 A1 Apr. 30, 2020

(30) Foreign Application Priority Data

Oct. 26, 2018 (JP) .............................. JP2018-202252

(51) Int. Cl.
*G06T 7/73* (2017.01)
*G01S 19/45* (2010.01)

(52) U.S. Cl.
CPC ............... *G06T 7/74* (2017.01); *G01S 19/45* (2013.01); *G06T 2207/10016* (2013.01); *G06T 2207/10028* (2013.01); *G06T 2207/30244* (2013.01); *G06T 2207/30252* (2013.01)

(58) Field of Classification Search
CPC .......... G06T 7/20; G06T 7/246; G06T 7/248; G06T 7/70; G06T 7/73; G06T 7/74; G06T 7/97; G06T 2207/30244; G06T 2207/30252; G06K 9/00791; G01C 21/005; G05D 1/0246; G05D 1/0253

See application file for complete search history.

(56) References Cited

U.S. PATENT DOCUMENTS

| | | | |
|---|---|---|---|
| 10,518,879 B1 * | 12/2019 | Zhang et al. | G06K 9/00664 |
| 2012/0176491 A1 | 7/2012 | Garin et al. | |
| 2016/0063341 A1 * | 3/2016 | Ogata et al. | G06K 9/00791 382/103 |
| 2018/0003505 A1 * | 1/2018 | Tateishi et al. | G06T 7/70 |
| 2018/0051990 A1 | 2/2018 | Takeuchi et al. | |
| 2021/0089572 A1 * | 3/2021 | Lawlor et al. | G06T 7/73 |

FOREIGN PATENT DOCUMENTS

| | | |
|---|---|---|
| JP | 2017-223664 A | 12/2017 |
| JP | 2018-28489 A | 2/2018 |

OTHER PUBLICATIONS

EESR—The Extended European Search Report of European Patent Application No. 19203695.2 dated Mar. 9, 2020.

M. Lhuillier, "Incremental Fusion of Structure-from-Motion and GPS Using Constrained Bundle Adjustments", IEEE Transactions on Pattern Analysis and Machine Intelligence, IEEE Computer Society, USA, vol. 34, No. 12, XP011490764, ISSN: 0162-8828, DOI: 10.1109/TPAMI.2012.157, pp. 2489-2495, Dec. 2012.

D. Schleicher et al., "Low-cost GPS sensor improvement using stereovision fusion", Signal Processing, Elsevier Science Publishers B.V. Amsterdam, NL, vol. 90, No. 12, XP027142103, ISSN: 0165-1684, pp. 3294-3300, Dec. 2010 cited in EESR dated Mar. 9, 2020 for corresponding European Patent Application No. 19203695.2.

D. Dusha et al., "Attitude observability of a loosely-coupled GPS/Visual Odometry Integrated Navigation Filter", ResearchGate, Australasian Conference on Robotics and Automation (ACRA 2010), XP055670895, Dec. 2010 cited in EESR dated Mar. 9, 2020 for corresponding European Patent Application No. 19203695.2.

A. Ben-Afia et al., "Review and classification of vision-based localisation techniques in unknown environments", IET Radar, Sonar and Navigation, The Institution of Engineering and Technology, UK, vol. 8, No. 9, XP006050853, ISSN: 1751-8784, DOI: 10.1049/IET-RSN.2013.0389, pp. 1059-1072, Dec. 2014.

EPOA—Communication pursuant to Article 94(3) EPC of European Patent Application No. 19203695.2 dated Mar. 22, 2021.

* cited by examiner

*Primary Examiner* — Andrew W Johns
(74) *Attorney, Agent, or Firm* — Fujitsu Patent Center

(57) ABSTRACT

A position estimation system includes one or more memories and one or more processors configured to acquire a first imaging position measured at a time of imaging a first image among a plurality of images imaged in time series, perform, based on a feature of the first image, calculation of a second imaging position of the first image, and perform, in accordance with a constraint condition that reduces a deviation between the first imaging position and the second imaging position, correction of at least one of the second imaging position or a three-dimensional position of a point included in the first image calculated based on the feature of the first image.

15 Claims, 18 Drawing Sheets

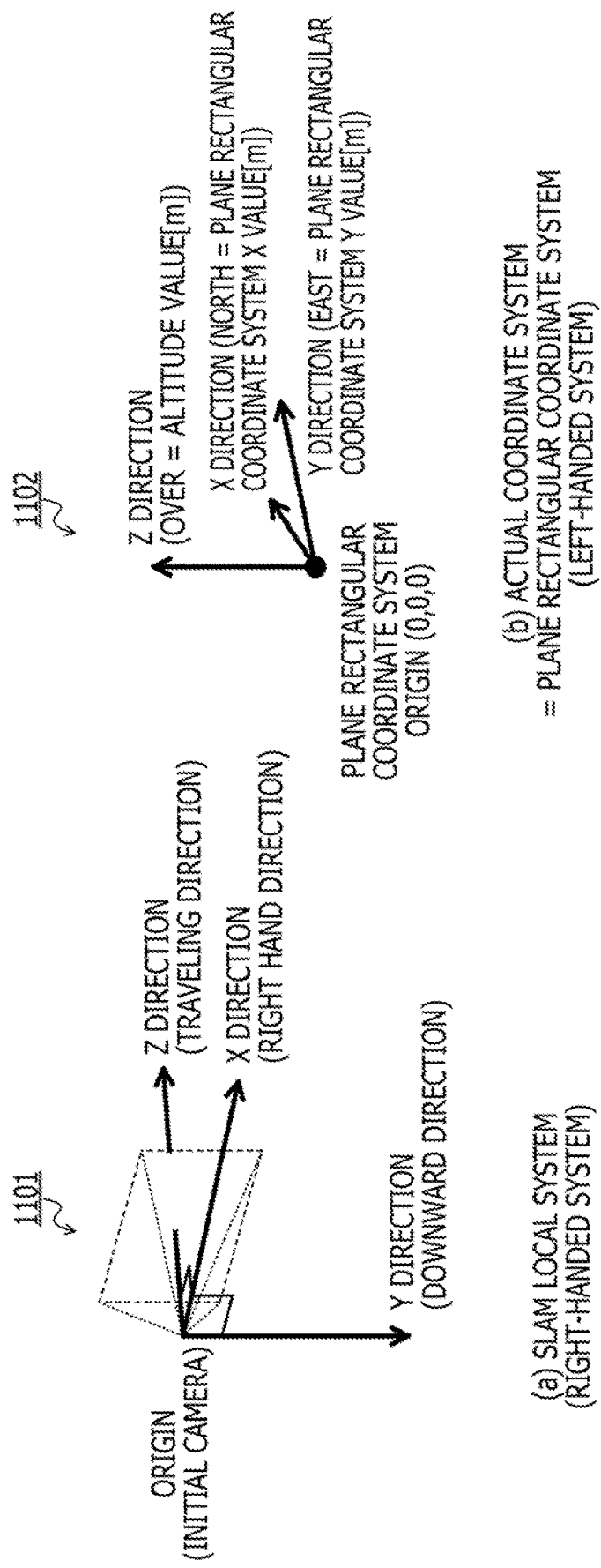

FIG. 11D
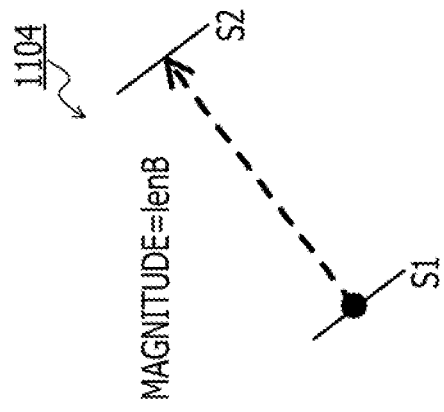
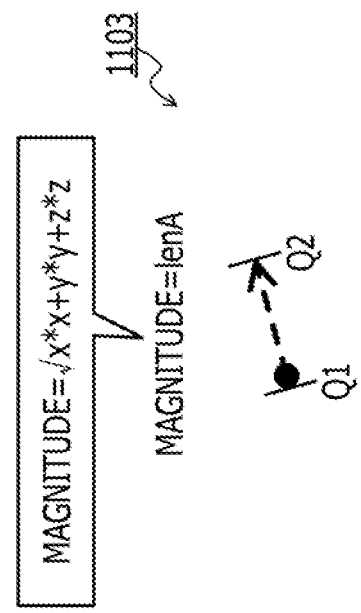

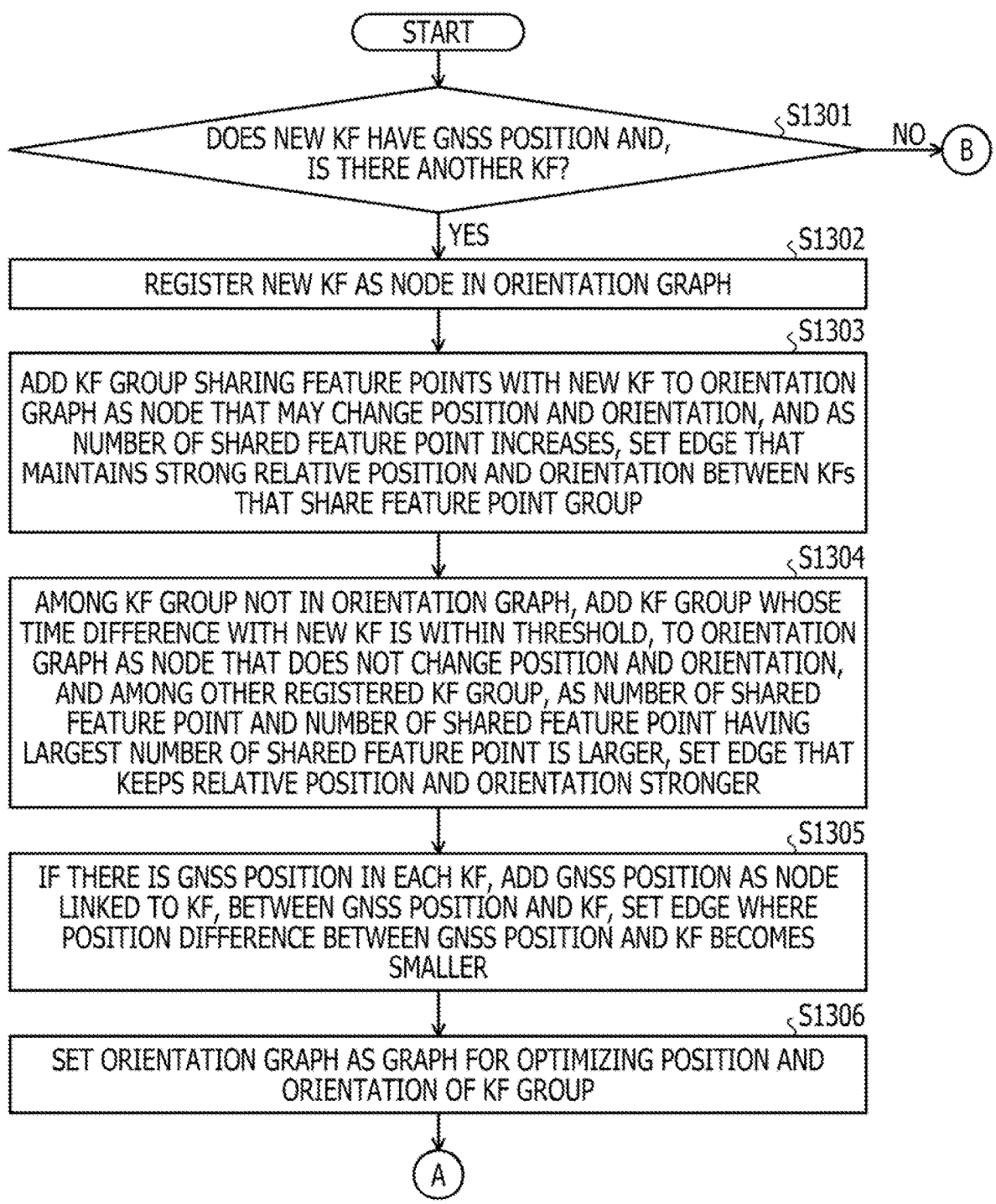

POSITION ESTIMATION SYSTEM AND POSITION ESTIMATION METHOD

CROSS-REFERENCE TO RELATED APPLICATION

This application is based upon and claims the benefit of priority of the prior Japanese Patent Application No. 2018-202252, filed on Oct. 26, 2018, the entire contents of which are incorporated herein by reference.

FIELD

The embodiment discussed herein is related to a position estimation technique.

BACKGROUND

In the related art, there is a technique called simultaneous localization and mapping (SLAM) in which a traveling route of a moving object and a surrounding environmental map are simultaneously created by inputting data about the surrounding situations acquired while the moving object is moving. Among the SLAM techniques, a technique that estimates a camera pose (imaging position and orientation) when a moving object is traveling by using a video imaged by the moving object as an input is called visual-SLAM (hereinafter referred to as "V-SLAM").

As a related art, there is a technique of post-correcting the position of the position and orientation of the moving object calculated by the SLAM technique with reference to information acquired by global navigation satellite system (GNSS) or the like when estimating the position of the moving object based on an image imaged by a camera mounted on the moving object using the SLAM technique.

For example, Japanese Laid-open Patent Publication No. 2018-028489 discloses related technologies.

SUMMARY

According to an aspect of the embodiments, a position estimation system includes one or more memories and one or more processors configured to acquire a first imaging position measured at a time of imaging a first image among a plurality of images imaged in time series, perform, based on a feature of the first image, calculation of a second imaging position of the first image, and perform, in accordance with a constraint condition that reduces a deviation between the first imaging position and the second imaging position, correction of at least one of the second imaging position or a three-dimensional position of a point included in the first image calculated based on the feature of the first image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11A is a diagram illustrating an example of transformation matrix calculation in an initial orientation and coordinate system setting unit;
FIG. 11D is a diagram illustrating an example of calculation of a scale transformation matrix M1;
FIGS. 13A and 13B are a flowchart illustrating an example of a processing procedure of a graph restriction generating unit.

DESCRIPTION OF EMBODIMENTS

Hereinafter, an embodiment of a position estimation system and a position estimation method according to the embodiment will be described in detail with reference to the drawings. First, an overview of a position estimation system and a position estimation method according to the present embodiment will be described with reference to FIGS. 1 to 4.

Data (such as video data) of vehicle-mounted devices in moving ordinary vehicles is collected (probed) in large quantity and used for in-vehicle data analysis. However, since a Global Positioning System (GPS) device mounted in the vehicle in many cases is only able to measure a position of a vehicle with a large error, it may not be applied to a service requiring a detailed position of the vehicle.

With respect to the data of the ordinary vehicle, if, for example, the pose (imaging position and orientation) at the time of imaging while traveling are accurately estimated and added to the in-vehicle image, it may be applied to a new service field that extracts features in the vicinity of a runway from the images and creates and updates a map such as a map for automatic driving, or that analyzes surrounding conditions at the time of imaging for automatic driving. Therefore, a technique is required for accurately estimating camera position and orientation (imaging position and orientation of video) that has imaged the in-vehicle image, as a premise of new service utilization using theses ordinary vehicle videos.

SLAM is a general term for a technique for simultaneously creating a traveling route of a vehicle (position and orientation of own vehicle) and a surrounding environmental map (such as three-dimensional (3D) position map of surrounding objects) by using the in-vehicle data, such as laser imaging detection and ranging (LIDAR) data, on surrounding conditions acquired during the movement as input. Above all, V-SLAM is a technique that is able to use a video imaged by an in-vehicle camera as an input to estimate and create an own vehicle traveling route (own vehicle position and orientation) and a surrounding environmental map (3D position map of image feature point group of surrounding subjects, hereinafter referred to as environmental map) using changes in the subject appearing in the imaged video. The vehicle position and orientation from the video of the ordinary vehicle may be estimated.

Since SLAM is a technique that performs pose estimation sequentially while simultaneously creating an environment environmental map in many cases, scale fluctuation occurs due to error accumulation over a long distance or adjustment failure in a place where the appearance changes greatly. As a result, such a problem as so-called "scale drift" occurs, as described above, in which the map is distorted and a correct environmental map may not be created, and an error occurs in the imaging position and orientation estimation based on the environmental map.

Figure 1:
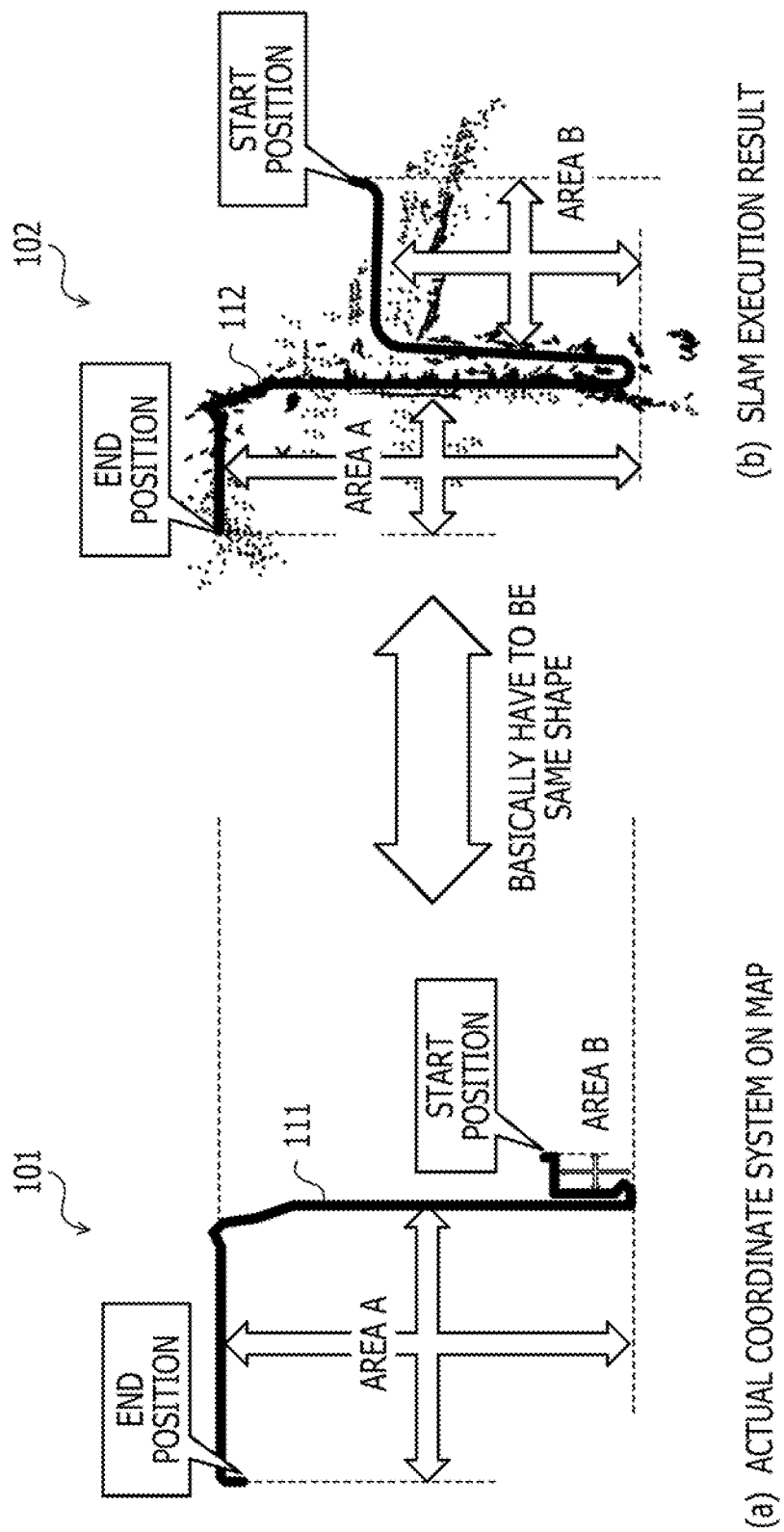
FIG. 1 is a diagram illustrating an example of scale drift.

FIG. 1 is a diagram illustrating an example of scale drift. In FIG. 1, the left and right diagrams illustrate a route diagram. The left diagram is (a) a route diagram illustrating an actual coordinate system 101 over the map actually measured by GPS, and the right diagram is (b) a route diagram based on a SLAM execution result 102.

In the route diagram illustrating the actual coordinate system 101 over the map, a traveling route 111 is indicated by a solid line, while in the route diagram based on the SLAM execution result 102, a traveling route 112 is indicated by a bar linking the estimated imaged positions of the respective images imaged over the traveling route 112. The fine point group scattered around the traveling route 112 is a 3D position map of the image feature group of the surrounding subjects, for example, a surrounding environmental map. For comparison, the SLAM execution result 102 is obtained by arranging the estimated traveling locus in the SLAM local coordinate system, which is particularly unrelated to the actual coordinate system, in a state of being enlarged and rotated as a whole in accordance with the traveling route 111.

As illustrated in FIG. 1, the traveling route 112 based on the SLAM execution result 102, for example, a traveling route estimated by V-SLAM (which linked the imaging positions of the traveling image), is largely different from the traveling route 111 illustrating the actual coordinate system 101 over the map. For example, the sizes of areas A and B surrounded by the route are both different from each other, and in the SLAM execution result 102, it may be seen that the scale is locally significantly different (scale drift is occurring) in the vicinity of the area A and the area B when the V-SLAM is executed.

With respect to the scale drift problem, SLAM has a technique called "loop closing" which detects the vehicle is passing through the same place (loop) while traveling and corrects the SLAM estimation result so that the estimated position and orientation and the environmental maps at the time of passing a plurality of times are all consistent at the place to improve the scale drift.

In V-SLAM, imaging position and orientation estimation of all the image frames is performed, and a main image frame is called a key frame ("KF"). In many cases, only the KF's imaging position and orientation is estimated with detailed analysis technique using environmental map while performing update adjustment such as addition of a feature point group and position change of the environmental map itself so that there is no contradiction between the imaging position and orientation both globally and locally. For remaining other image frames, which is not the KF, the imaging position and orientation are easily estimated using the relative relationship from the KF without updating the environmental map.

Figure 2:
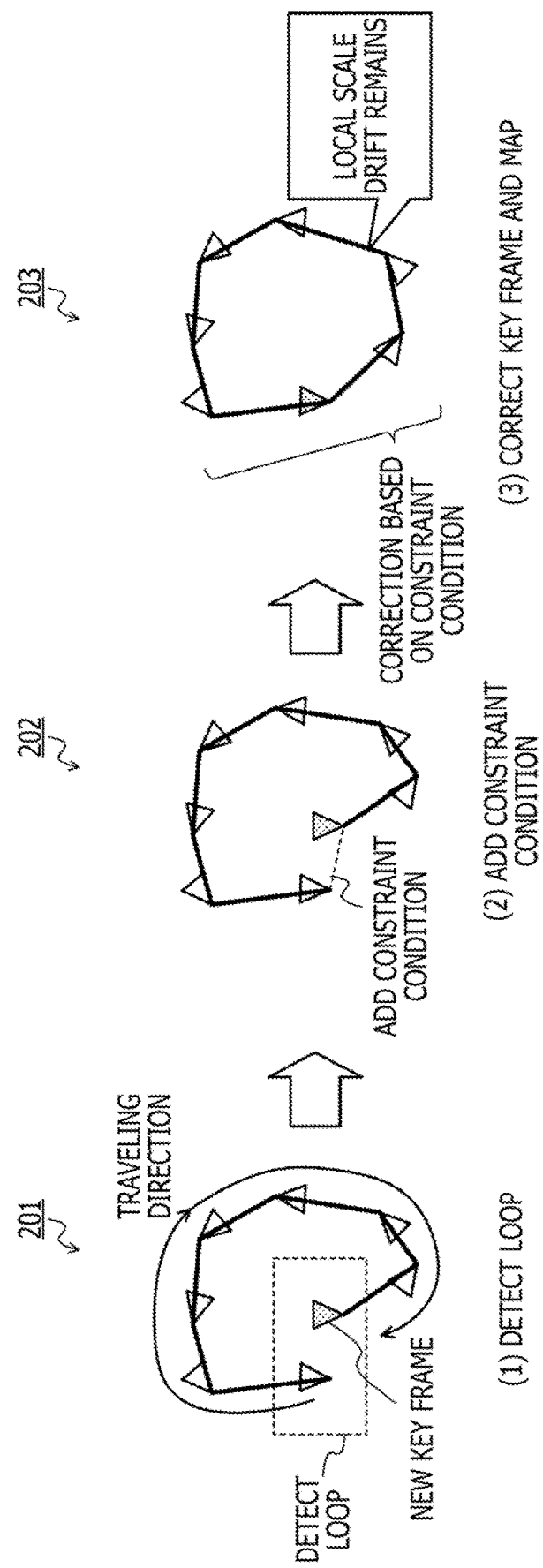
FIG. 2 is a diagram schematically illustrating an example of loop closing.

FIG. 2 is a diagram schematically illustrating an example of loop closing, and illustrates an application example of the loop closing technique at the time of position and orientation estimation of the KF. In FIG. 2, each KF is indicated by a triangle. As indicated by reference numeral 201, (1) a loop is detected which is the same place based on the similarity between KFs in SLAM, for example, the similarity between KF images in the case of V-SLAM. For example, a loop is detected from image similarity or the like between the newly created KF and the past KF. Reference numeral 201 indicates a state in which a loop is detected.

Next, as indicated by reference numeral 202, (2) a constraint condition that brings the KFs of the discovered loop points close to each other is added in addition to the constraint condition at the time of optimization calculation of position and orientation estimation of usual SLAM which constrains the relationship between consecutive KFs to be adjacent to each other at an appropriate proximity. In reference numeral 202, a portion indicated by a dotted line indicates a constraint condition. As indicated by reference numeral 203, (3) the KF group in the vicinity of the loop and the environmental map are corrected by the new constraint condition group including the added constraint condition.

As a result, since the position and orientation of KF in the vicinity of the loop are corrected, the scale error in the vicinity of the loop is reduced. However, the scale error of the KF apart from the loop is not reduced, and the loop may not occur during traveling, so there is a problem (first problem) that the scale drift improvement effect by the loop closing is limited. For example, although whole loop is corrected to be consistent, there is a problem that the local scale change is not corrected. In the first place, there is a problem that it may not be applied unless the vehicle travels in a loop.

Since V-SLAM creates the environmental map by the difference from the initial image, it becomes a value in the local coordinate system (SLAM local system) unique to the video, independent from the actual coordinate position (latitude and longitude, actual world scale). Therefore, there is a problem (second problem) that it is difficult to utilize it in correspondence with the map of the actual world, and it is difficult to utilize it for the service utilization using the ordinary vehicle video described above.

In the related art, SLAM was developed for autonomous movement of a robot and the like, and it was important to be able to move around the surrounding objects while creating a disposable environmental map, and the accuracy of the movement route itself (such as determination of the size of an absolute value, scale fixation) was not very important. Therefore, it is required to solve two of the first problem and the second problem newly in order to apply it to the imaging position and orientation estimation for service utilization using the ordinary vehicle video.

On the other hand, in the camera pose (imaging position and orientation) estimation by V-SLAM of the related art, the environmental map calculated by V-SLAM and the estimated imaging position are sequentially corrected using local linear transformation using the GNSS high-accuracy position separately acquired, by sensors, simultaneously with the V-SLAM input video after V-SLAM is executed in order to reduce the scale drift which is the first problem unique to V-SLAM.

However, in this method, the position coordinate transformation used for correction is a local linear transformation (affine transformation) by the position pair of two points separated by a prescribed distance, so that only a rough correction may be made, and even in a scene where the scale changes greatly particularly after turning, such as turning to the left or right, there is a possibility that two points before and after turning to the left or right are selected, and even for images whose scale is relatively correct before turning left or right, the correction accuracy is lowered because the position coordinate transformation with a large correction for the image after turning to the left or right with large scale error is applied.

Basically, if the imaging position changes, the appearance also changes, so changing the imaging position affects the orientation. However, there is a problem that the estimated orientation may not be corrected at all since the only actual correction performed after V-SLAM is position correction.

Since it is required to perform correction processing after calculation of V-SLAM, processing cost other than V-SLAM processing is required.

As described above, in the related art using V-SLAM, there is a problem that the processing cost for correcting and calculating the imaging position and orientation of the actual coordinate system is high, and the accuracy of the corrected estimated imaging position and orientation is low. An object of the embodiment is to solve the problems of the processing cost and the estimation accuracy deterioration.

Figure 3:
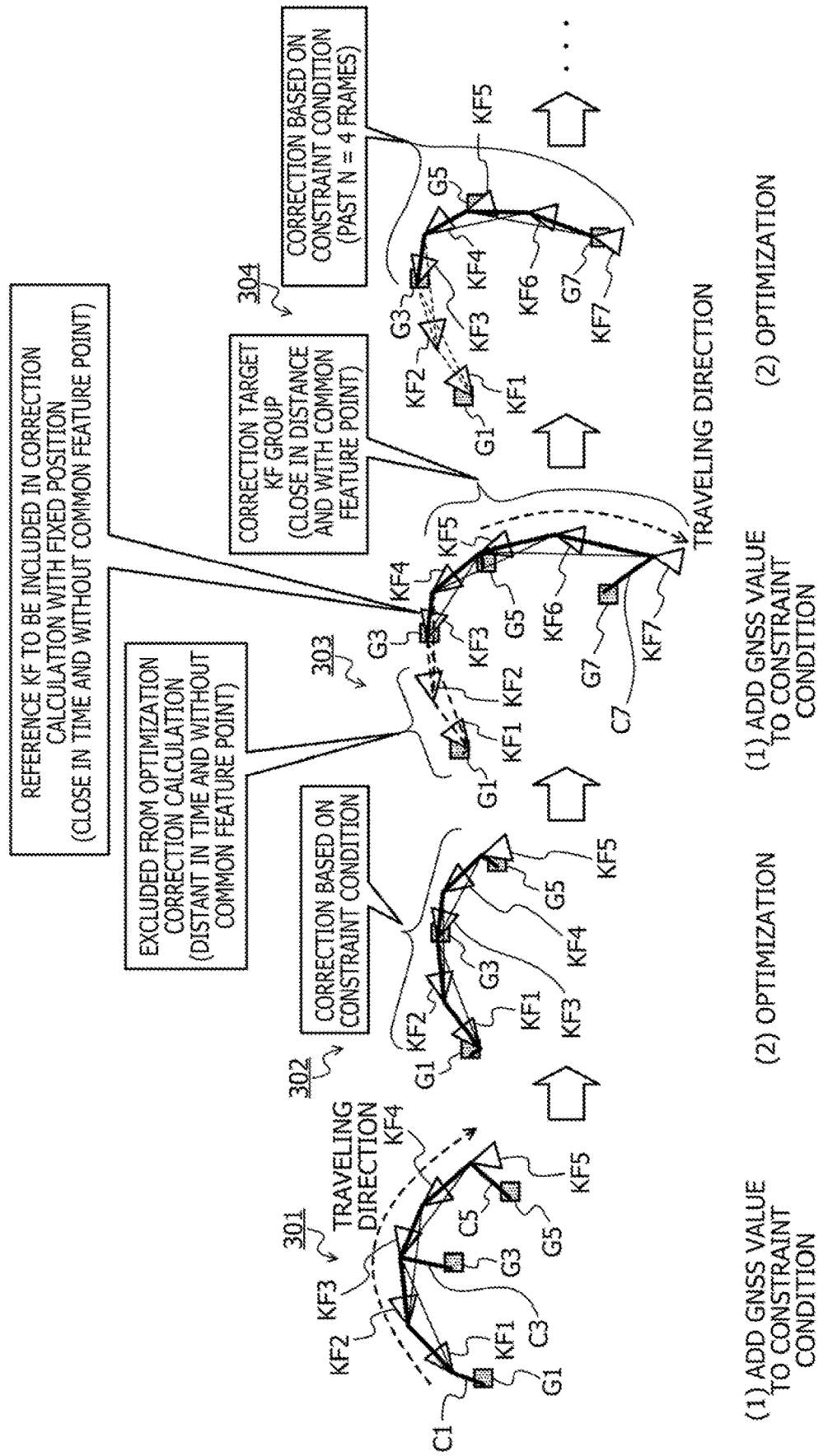
FIG. 3 is a diagram schematically illustrating an example of a pose graph and optimization in a position estimation method according to an embodiment.
Figure 4:
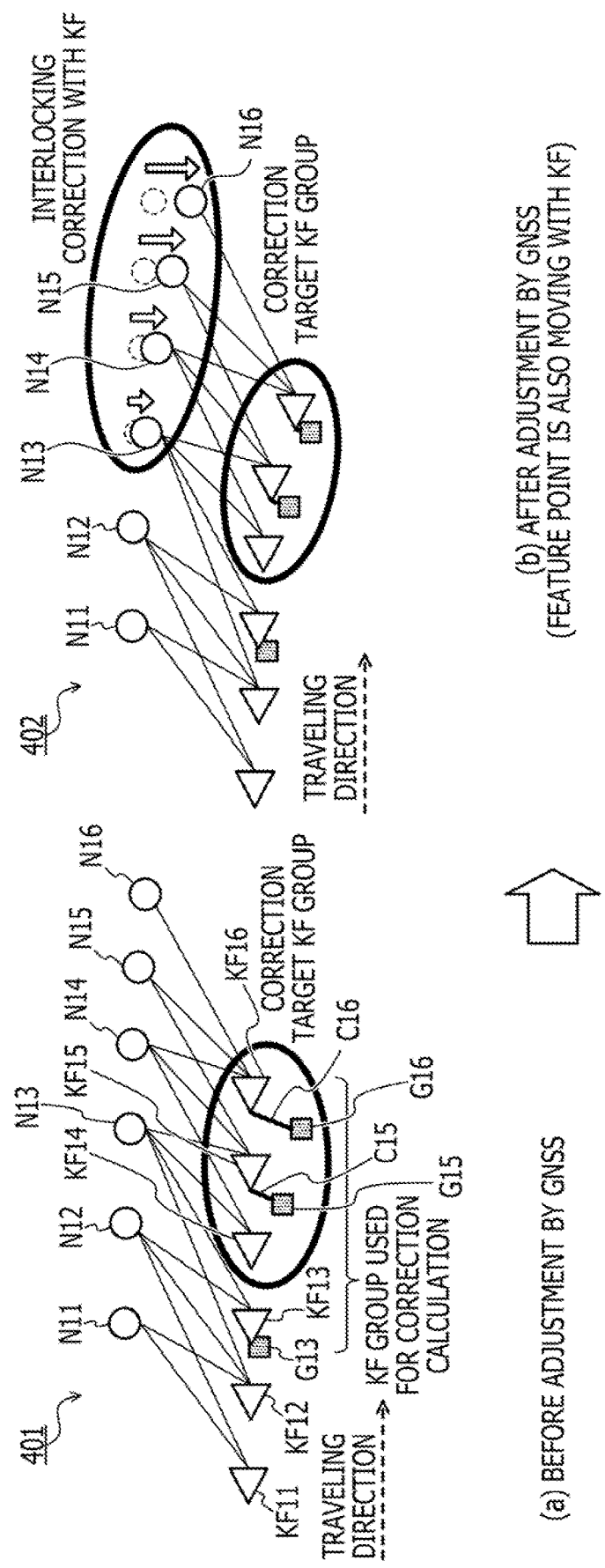
FIG. 4 is a diagram schematically illustrating another example of the pose graph and optimization in the position estimation method according to the embodiment.

According to the embodiment, with the position estimation method according to the embodiment illustrated in FIGS. 3 and 4, GNSS information is included in optimization (error minimization) calculation of 3D feature points and traveling locus, and correction is sequentially performed using the GNSS information (and using appropriate KF based on the scene change). As a result, it is possible to perform correction processing that does not change in scale even if the traveling distance is extended, so that the scale drift over a wide area may be avoided with high accuracy.

In the present implementation, in order to reflect both the change in appearance due to image analysis and the change in GNSS position without difficulty in the optimization calculation of the position and orientation of the V-SLAM key frame (KF) and the feature point group position of the surrounding environmental map, two-stage processing is performed: first, roughly adjust the GNSS position by position and orientation optimization of KFs (FIG. 3) using GNSS position, and sequentially perform optimization (FIG. 4) of both the position and orientation of KFs and the feature point group of the environmental map again using the GNSS position to match the GNSS position in detail. However, this is an example as described later, and when performing optimization sequentially, the optimization of only the position and orientation of KF in the former stage may be normally or occasionally omitted. In that case, only optimization including the latter stage map feature point group may be performed.

Unless otherwise stated, the subsequent optimization of KF indicates the optimization of the position and orientation of KF, but only the position may be optimized. For example, only the position may be optimized in the former stage, and the position and orientation may be optimized in the latter stage.

Below, the two-stage processing will be described with reference to FIGS. 3 and 4. FIG. 3 is a diagram schematically illustrating an example of a pose graph and optimization in the position estimation method according to the embodiment. FIG. 3 illustrates an example of a newly created pose graph used for two optimizations in a graph restriction generating unit 532 described later, and optimization using the pose graph, which is a new additional processing in a KF pose and feature point map optimization unit 533 described later. FIG. 3 illustrates an example of the former stage processing of optimizing the position and orientation of the KF roughly using the GNSS position in the two-stage processing described above.

In FIG. 3, key frames (KF) indicated by triangles are added in the traveling direction indicated by dotted arrows such as KF1, KF2, KF3, . . . . The squares indicate GNSS values for the GNSS position. The situation indicated by reference numeral 301 indicates that the KFs are added in the order of KF1→KF2→KF3→KF4→KF5 in the time series, and KF5 is the latest orientation estimation target KF, G1, G3, and G5 indicate GNSS values for KF1, KF3, and KF5, respectively.

The processing procedure of the sequential correction of the key frame (KF) position and orientation using the GNSS value for GNSS position will be described in the order of reference numerals 301 to 304.

First, as indicated by reference numeral 301, at the beginning of the movement route, (1) the same constraint conditions as those used in the V-SLAM of related art indicated by solid lines linking adjacent KFs, which minimize the deviation from the relative position and orientation change amount of the KF in accordance with the change in appearance between the KF image, are set to all the KFs including KF5 which is a newly obtained key frame (KF) in addition to the past KF group (KF1 to KF4) obtained so far. In reference numeral 301, a constraint condition is established to link the adjacent KF1 to KF5.

In the present implementation, in addition to the constraint condition of the related art linking KFs, if KF has a GNSS position, new constraint conditions are set to minimize the deviation between the KF and GNSS values. In reference numeral 301, a solid line linking KF1 and G1 indicates a constraint condition C1. Constraint conditions C3 and C5 are the constraint condition of KF3 and G3, and KF5 and G5, respectively.

As indicated by reference numeral 301, two types of constraint conditions of the constraint condition regarding the appearance of these KFs and the constraint condition of KF and GNSS value are set. It is possible to adjust which of the two types of constraint conditions takes precedence by, for example, setting weight parameters of the respective constraint conditions to change the influence on overall optimization. For example, when it is known that the accuracy of the GNSS position to be used is very good, the weight is adjusted to be heavier to increase the influence of the constraint condition with the GNSS value.

As indicated by reference numeral 302, (2) the position and orientation of KF is corrected by optimization based on the constraint conditions set at reference numeral 301 including the past key frame (KF) group. As understood from reference numeral 302, correction is made so that KF1 approaches G1, KF3 approaches G3, and KF5 approaches G5 under the constraint condition with the GNSS value. As described above, based on the constraint condition, the KF is corrected to be close to the GNSS value so as to minimize the error of the entire constraint condition while adjusting to changes in the appearance of the KFs. For this reason, as a result of the correction, the position of the KF may not be a result that completely matches the GNSS value.

Next, reference numeral 303 indicates a processing procedure when the moving object further travels the route to a position to add KF7 sufficiently separated from KF1 which is the first key frame (KF). In reference numeral 303, KF6 and KF7 (latest orientation estimation target KFs) are newly added as the moving object moves in the traveling direction (elapse of time).

As indicated by reference numeral 303, (3) for the newly obtained key frame (KF), as in the case of reference numeral 301, the constraint condition of the related art regarding the change in appearance with the adjacent KF and the constraint condition which minimizes the deviation between the KF and the GNSS value when the KF has the GNSS position are added respectively.

Unlike reference numeral 301, since the route is sufficiently extended, the KF used for optimization correction calculation, for example, the KF for setting the constraint condition is selected. Either of the following two selection methods may be used in the selection of KF used for optimization correction calculation. The first selection method is a method based on temporal or distance proximity. For example, it is possible not to use a KF whose distance difference which may be roughly estimated from the imaging time difference or the GNSS position is too large.

The second selection method is a method based on the presence or absence of a common feature point. For example, when there is a common feature point, it is set as the KF for position and orientation adjustment target, for example, the correction target KF group.

On the other hand, when there is no common feature point, the position and orientation is not adjusted (fixed), but it is set as a reference KF use for adjustment.

Alternatively, instead of selecting the correction target KF or selecting the reference KF for adjustment based on the number of common features with the latest KFs, temporal proximity, and the like, the same processing may be performed by changing the adjustment weight. For example, KF having a small number of common features or distant in time or distance is weighted so as to reduce the adjustment influence.

In reference numeral 303, since KF1 and KF2 are distant in time and do not have common feature point, they are excluded from optimization correction calculation, and no constraint condition is set. Since KF3 is a KF close in time but has no common feature point, so it is a reference KF to be included in the correction calculation with a fixed position, and the constraint condition regarding KF is set, but the position and orientation are fixed so that the position and orientation do not change by adjustment. Since KF4 to KF7 are a group of correction target KFs that are close in distance and have common feature points, they set the constraint condition regarding the KF and change the position and orientation by adjustment. At this time, the constraint condition may be weighted so that the newer the KF, the easier it is to change the position and orientation. In this way, each constraint condition for adjusting the position and orientation of latest orientation estimation target KF7 is set while selecting a KF.

As indicated by reference numeral 304, (4) the position and orientation of the key frame (KF) is corrected by optimization based on the constraint conditions, including past N (N=4) frames. As understood from reference numeral 304, for example, KF7 is largely corrected based on G7, and KF4 to KF6 are also corrected at the same time. According to the above-described procedure, it is possible to perform processing of sequential correction using GNSS value each time KF is added.

The schematic KF position and orientation optimization as illustrated in FIG. 3 may be performed, for example, using an optimization processing using an existing random graph structure. As a specific pose graph, KF group is linked as a node under constraint conditions, and if there is a GNSS position regarding the KF corresponding to the input GNSS information, the GNSS position is also coupled to the KF as a new node, and a constraint condition is set such that the difference between the GNSS position and the KF position becomes smaller. Optimization is performed using the graph structure created in this way.

Although only the GNSS position (actual coordinate position) may be set as the initial value of the node of the GNSS position, the current estimated orientation information of KF corresponding to the GNSS position may be added and set as a node having values of position and orientation. These values (GNSS value regarding GNSS position and orientation information obtained from KF) may be appropriately corrected and used. The orientation obtained from the KF may be corrected and used, for example, when the value of the KF pose is apparently wrong.

For KFs that do not hold GNSS positions, GNSS position nodes may be held by all the KFs by performing correction calculation of GNSS values. Graph optimization may be calculated more easily by making the coupled nodes and the held data the same (position and orientation value) at all KF nodes.

When the input orientation information of the video may be acquired, the input camera orientation information may be used instead of the estimated KF orientation. V-SLAM may estimate the imaging orientation from the video change. However, when traveling a straight road and the like, if an error occurs in the orientation change (roll angle) such as rotation with respect to the traveling direction axis, it is difficult to recover (value improvement) from the error. Therefore, it is possible to estimate the imaging position and orientation with higher accuracy by inputting the camera orientation information separately measured by a sensor. At this time, the timing at which the input orientation information is used may also be random. For example, the input orientation information corresponding to the KF may be normally used, or the input orientation information may be used only for the new KF, and the other KF group may use the estimated orientation. Alternatively, the input orientation information may be used only when the estimated KF orientation is apparently wrong.

In FIG. 3, for example, as a KF group for the graph structure, a new KF group video time sequentially or spatially close to the new KF is used. For example, a random KF group in which the video time of the KF image is close to the new KF (time difference is within prescribed time) or the held GNSS position is close to the new KF (GNSS position difference is within prescribed distance) is selected using a prescribed threshold value. In addition, the threshold value of the minimum number of map feature points to be shared is determined, and a KF group sharing a map feature point group having a 3D position with the new KF a prescribed number or more is also selected by effectively using the sharing relationship between KF feature points held as covisibility graph described later.

Both KF groups selected by these two methods are considered as nodes of graph structure, and as the number of sharing map feature points shared between nodes (KFs) is increased, a constraint condition (for example, an edge with which the relative position and orientation are kept stronger) which is influenced by the change in the position and the orientation of the other party is set.

In FIG. 3, the KF having no common feature point may be set as a node that is not affected by the position and orientation change due to graph optimization, for example, a node that is fixed without changing the position and orientation.

As described above, in FIG. 3, the KF whose video time close is selected in order to smoothly correct the position and orientation in accordance with the new KF sequentially. In FIG. 3, the KF group is selected using the number of sharing map feature points instead of the video time, taking into consideration the case where it is difficult to set the time limit threshold value based on the video time. The closeness in time of videos often has many map feature points to be shared, and is often close in space. By selecting a KF group suing any of these, it is possible to select a KF group that is more closely related to the position and orientation of a new KF as a correction target.

In the KF pose and feature point map optimization unit described later, by optimizing the position and orientation of the new KF and the position and orientation of the KF group using the GNSS position, using the pose graph adjusted the influence range of the correction optimization through the automatic selection of the KF group as the node, it is possible to estimate the KF position and orientation by accurately avoiding the scale drift that occurs in the position and orientation estimation of only image feature changes, which is the problem of V-SLAM of the related art, while taking into consideration a scene change (change of subject appearing over image). The correction processing using the position estimation method may be applied without loop traveling.

FIG. 4 is a diagram schematically illustrating another example of the pose graph and optimization in the position estimation method according to the embodiment. FIG. 4 illustrates an optimization example using the detailed GNSS position of the latter stage of the two-stage processing in order to optimize and fine adjust the position and orientation of the KF group again so as to improve the overall consistency while changing the 3D positions of the surrounding map feature points according to the position and orientation of the KF group changed by the optimization based on the GNSS position in FIG. 3.

Similar to FIG. 3, FIG. 4 also illustrates an example of implemented as optimization using a pose graph. In FIG. 4, reference numeral 401 indicates (a) a state before adjustment by GNSS, and reference numeral 402 indicates (b) a state after adjustment by GNSS. As understood from reference numeral 402, (b) after adjustment by the GNSS, it turns out that the feature point is also moving with KF.

In FIG. 4, key frames (KF) indicated by triangles are added in the traveling direction indicated by dotted arrows such as KF11, KF12, KF13, ..., and KF16. KF16 is the latest KF. G13, G15, and G16 indicate GNSS values obtained from GNSS positions in KF13, KF15, and KF16, respectively.

In the pose graph of FIG. 4, in addition to the nodes of the KF group and the GNSS positions, such as the pose graph of FIG. 3, map feature point group around the new KF are added as nodes of the graph. For example, as indicated by reference numeral 401 in FIG. 4, a map feature point group browsed from the KF group (KF11 to KF16) of the pose graph is added as nodes (N11 to N16) of the map feature point group indicated by white circles.

Also in FIG. 4, as in FIG. 3, an edge of a constraint condition (C15, C16) having a random weight is added between the GNSS value node and the KF node. An edge of a constraint condition having a random weight is also added between the node group of the map feature point group and the node group of the browsing KF. At this time, the nodes of the map feature point group may use all the map feature point group browsed from the KF group, or may use some of them. As described above, by automatically controlling the key frames (KF) and the feature point group used for optimization (error minimization) calculation in accordance with a scene change, accurate position and orientation adjustment is realized.

Selection of the feature point group used for adjustment may be automatically determined as follows from KF selection. For example, feature points present in the position and orientation adjustment target KF group may be set as position adjustment target feature points. Feature points exist only in the fixed position KF (regardless of whether it is used for adjustment as a reference) may be used as (fixed) feature points that are not adjusted.

For example, in FIG. 4, KF11 and KF12 are KFs that are not targets of optimization calculation, the positions and orientations of KF11 and KF12 do not change. KF13 is a reference KF used for optimization adjustment with a fixed position, and KF14, KF15, and KF16 are KFs to be subjected to the position and orientation adjustment in the optimization calculation. N11 and N12 are feature points that are not targeted for optimization calculation and do not change in position. On the other hand, N13 to N16 are position adjustment target feature points. Among them, N14 to N16 are feature points related to the KF16 that may be browsed from the latest KF16 that is the latest position and orientation estimation target.

For the edge linking the KF and the map feature point, a constraint condition is set such that the position or the position and the orientation change is performed as, for example, the difference (reprojection error) between the image position where the map feature point is projected over the KF image and the image position of the image feature extracted in the KF image that seems to be the same as the feature point from the image feature amount is larger.

In the pose graph in FIG. 4, by adding new map feature point to nodes, KFs sharing many map feature points receive similar correction effects by holding many edges with the same feature point node. Therefore, all the edges set between the KFs set in FIG. 3 (edges of constraint condition indicating the number of shared feature points) may be deleted.

In order to change the influence on the overall optimization depending on the type of edge as the entire pose graph, weights may be set as the constraint conditions as in FIG. 3. The system adjustment may be easily performed by setting the weights to influence the optimization at a random ratio with respect to the edge constraint condition of GNSS position and KF illustrating adjustment by GNSS position and the edge constraint condition of map feature point and KF illustrating adjustment by image based image feature change. For example, when the number of map feature point nodes is very large, the image-based influence using the node becomes very strong, so the weights may be adjusted smaller than the other weights to reduce the influence accordingly.

In the position estimation method according to the present embodiment, by graph optimization using the pose graph illustrated in FIG. 4, it is possible to correct the position of surrounding map feature point group without difficulty, while finely adjusting the position of the KF group if required, in accordance with the optimized KF group at the GNSS position as illustrated in FIG. 3. For this reason, it is possible to obtain a camera pose (imaging position and orientation) appropriately corrected for an image-like scene change as V-SLAM, which may not be obtained only by correcting the imaging position of the output result of the V-SLAM of the related art, and also for the GNSS position. It is also possible to obtain a 3D position (actual coordinate map) of the feature point group similarly corrected.

Figure 5:
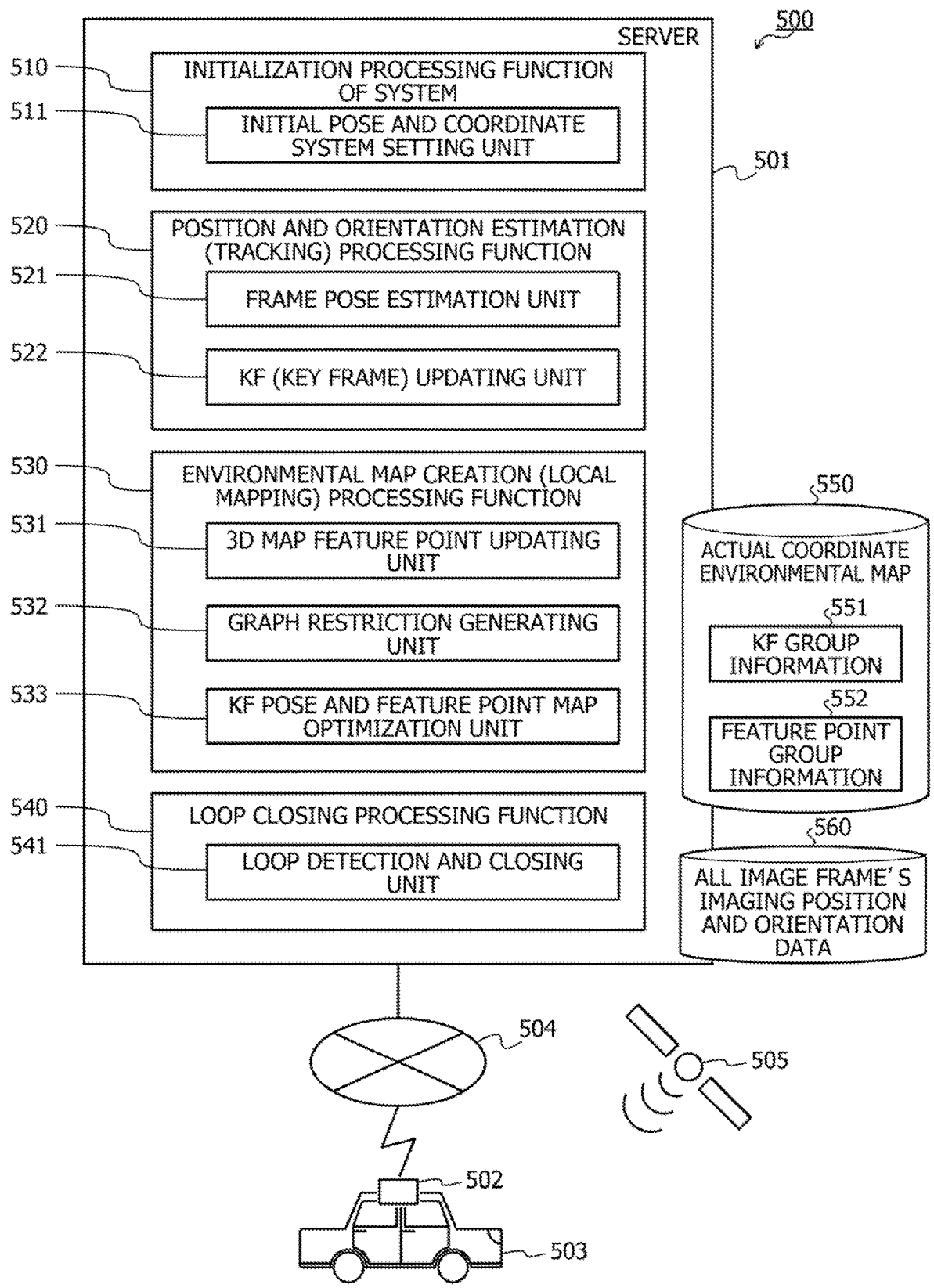
FIG. 5 is a diagram illustrating an example of a system configuration of a position estimation system according to the embodiment.

FIG. 5 is a diagram illustrating an example of a system configuration of the position estimation system according to the embodiment. In FIG. 5, a position estimation system 500 according to the embodiment includes a server 501 which is an example of a position estimation apparatus and a vehicle-mounted device 502 mounted on a moving object 503, which is an example of an information collection device for collecting GNSS information from the video and a satellite 505. The server 501 and the vehicle-mounted device 502 are coupled by a network 504 to configure the position estimation system 500. The position estimation system 500 may realize its function by a cloud computing system (not illustrated).

The server 501 includes functional units such as an initial pose and coordinate system setting unit 511, a frame pose estimation unit 521, a key frame (KF) updating unit 522, a 3D map feature point updating unit 531, the graph restriction generating unit 532, the KF pose and feature point map optimization unit 533, and a loop detection and closing unit 541. The control unit of the server 501 may be configured by the components 511, 521, 522, 531 to 533, and 541. Details of these components will be described later.

The server 501 includes an actual coordinate environmental map 550 that stores KF group information 551, feature point group information 552, and the like. Alternatively, the server 501 is coupled to the actual coordinate environmental map 550 in an accessible manner.

For example, the actual coordinate environmental map 550 may be provided (stored) in the server 501, and the actual coordinate environmental map 550 may be provided in another server (not illustrated), and may be coupled to the server 501 by a network such as the network 504. Details of the actual coordinate environmental map 550 will be described later.

The above-described components may be roughly divided into four functional units. The initial pose and coordinate system setting unit 511 may realize an initialization processing function 510 of the system. A position and orientation estimation (tracking) processing function 520 may be realized by the frame pose estimation unit 521 and the KF updating unit 522. An environmental map creation (local mapping) processing function 530 may be realized by the 3D map feature point updating unit 531, the graph restriction generating unit 532, and the KF pose and feature point map optimization unit 533. A loop closing processing function 540 may be realized by the loop detection and closing unit 541.

The moving object 503 is, for example, a coupled car that collects information, but is not limited thereto. It may be a general passenger vehicle, a commercial vehicle such as a taxi, a two-wheeled vehicle (motorcycle or bicycle), a large-sized vehicle (bus or truck), or the like. The moving object 503 may be a ship moving over water, an aircraft moving in the sky, an unmanned aircraft (drone), an automatic traveling robot, or the like.

The vehicle-mounted device 502 collects information on the moving object 503 including information on the imaged video and GNSS information. Information on the moving object 503 may also include the orientation information on the moving object 503 collected from the moving object 503.

The moving object 503 includes the vehicle-mounted device 502. The vehicle-mounted device 502 may be a dedicated device mounted on the moving object 503, or may be a removable device. A mobile terminal device having a communication function such as a smartphone or a tablet may be used as the moving object 503. The function of the vehicle-mounted device 502 may be realized using the function of the moving object 503.

Therefore, the expression "vehicle-mounted" of the vehicle-mounted device 502 is not limited to the meaning of a dedicated device mounted on a moving object. The vehicle-mounted device 502 may be any type of device as long as the device has a function of collecting information in the moving object 503 and transmitting the collected information to the server 501.

The vehicle-mounted device 502 acquires information (in-vehicle data) on the moving object 503 including information on the imaged video and GNSS information, and stores the acquired in-vehicle data. The stored in-vehicle data is transmitted to the server 501 via the network 504 by wireless communication. Various data including a program distributed from the server 501 is received by wireless communication via the network 504.

The vehicle-mounted device 502 may acquire information of another moving object 503 traveling nearby by using the short distance communication function, and may transmit the information to the server 501. The vehicle-mounted devices 502 may communicate with each other by the short distance communication function, and may communicate with the server 501 via another vehicle-mounted device 502.

In the position estimation system 500, the server 501 may acquire in-vehicle data from the vehicle-mounted device 502 mounted on the moving object 503, and may distribute various data to the vehicle-mounted devices 502.

The vehicle-mounted device 502 may not have a communication unit. For example, the vehicle-mounted device 502 may not be coupled to the server 501 via the network 504. In that case, the data accumulated in the vehicle-mounted device 502 may be input to the server 501 off-line (for example, manually via recording media).

In FIG. 5, the server 501 is configured to have each functional unit of the initial pose and coordinate system setting unit 511, the frame pose estimation unit 521, the KF updating unit 522, the 3D map feature point updating unit 531, the graph restriction generating unit 532, the KF pose and feature point map optimization unit 533, and the loop detection and closing unit 541. Although illustration is omitted, at least one of these functional units may be added to the server 501, or instead of the server, and may be included in the vehicle-mounted device 502.

When the vehicle-mounted device 502 includes at least one of the functional units 511, 521, 522, 531, 532, 533, and 541, the content of the processing performed by the server 501 may be the same. However, 3D map information may be acquired from an external server (not illustrated) via a wireless network or the like as appropriate, in addition to being held and used in any medium (such as DVD/BL disc, HDD).

Figure 6:
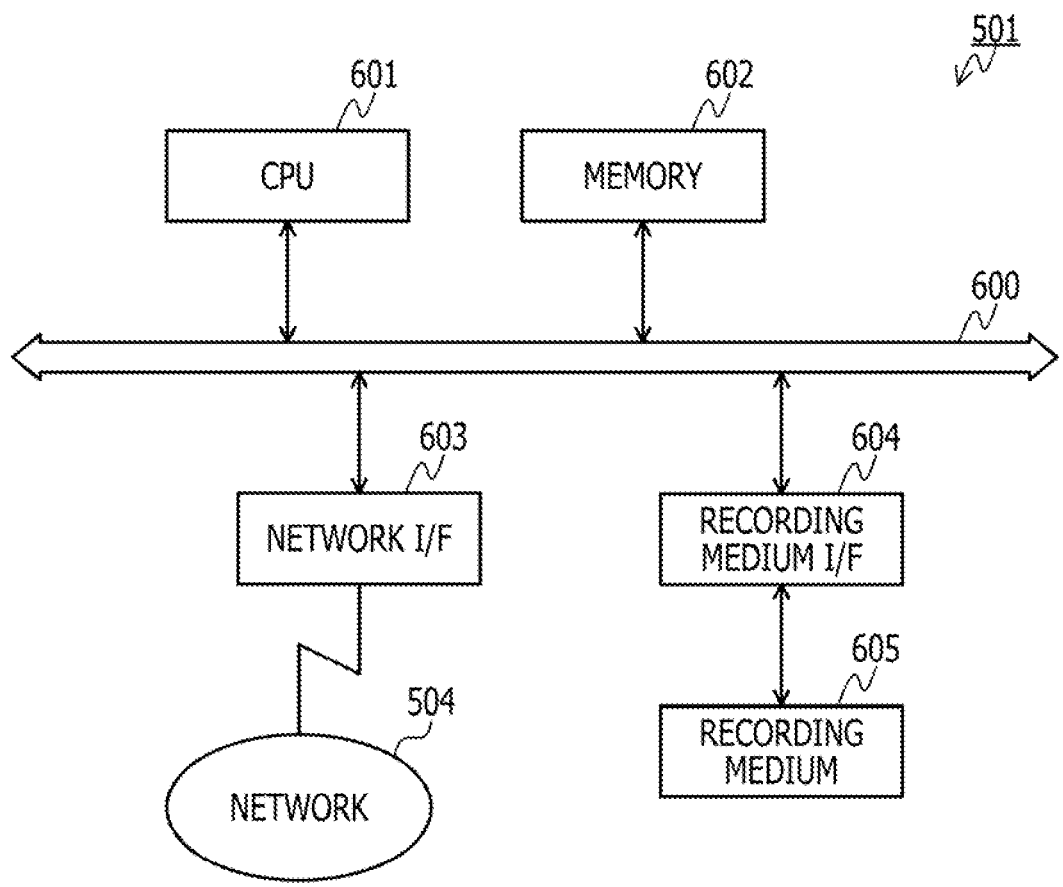
FIG. 6 is a block diagram illustrating an example of a hardware configuration of a position estimation apparatus (server)

FIG. 6 is a block diagram illustrating an example of a hardware configuration of the position estimation apparatus. The server 501, which is an example of a position estimation apparatus, includes a central processing unit (CPU) 601, a memory 602, a network Interface (I/F) 603, a recording medium I/F 604, and a recording medium 605. These components are coupled to one another through a bus 600.

The CPU 601 is in charge of overall control of the server (position estimation apparatus) 501. The memory 602 includes, for example, a read-only memory (ROM), a random-access memory (RAM), a flash ROM, and the like. For example, the flash ROM and the ROM store various programs, and the RAM is used as a work area of the CPU 601. The program stored in the memory 602 causes the CPU 601 to execute coded processing by being loaded into the CPU 601.

The network I/F 603 is coupled to the network 504 through a communication line, and is coupled to another device (for example, a device in which the vehicle-mounted device 502, the actual coordinate environmental map 550, the all image frame's imaging position and orientation data 560 are stored, or another server or system) via the network 504. The network I/F 603 controls the interface between the network 504 and the internal device, and controls input and output of data from another device. As the network I/F 603, for example, it is possible to adopt a modem, a LAN adapter, or the like.

The recording medium I/F 604 controls read/write of data for the recording medium 605 under the control of the CPU 601. The recording medium 605 stores the data written under the control of the recording medium I/F 604. Examples of the recording medium 605 include a magnetic disc and an optical disc.

The server 501 may include, for example, a solid state drive (SSD), a keyboard, a pointing device, a display, and the like, in addition to the above-described configuration portions.

Figure 7:
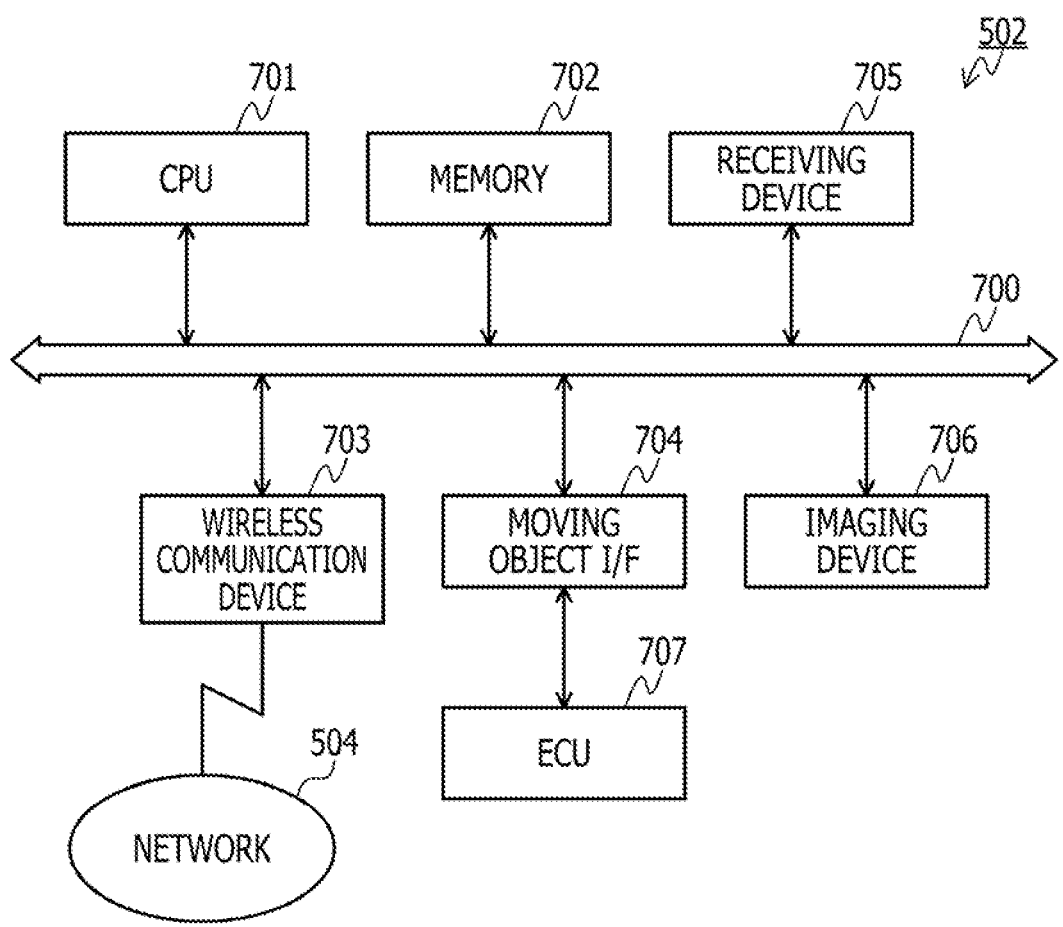
FIG. 7 is a block diagram illustrating an example of a hardware configuration of a vehicle-mounted device.

FIG. 7 is a block diagram illustrating an example of a hardware configuration of a vehicle-mounted device. The vehicle-mounted device 502, which is an example of the information collection device, includes a CPU 701, a memory 702, a wireless communication device 703, a moving object I/F 704, a receiving device 705, and an imaging device 706. These components are coupled to one another through a bus 700.

The CPU 701 is in charge of overall control of the vehicle-mounted device 502. The memory 702 includes, for example, a ROM, a RAM, and a flash ROM. For example, the flash ROM and the ROM store various programs, and the RAM is used as a work area of the CPU 701. The program stored in the memory 702 is loaded into the CPU 701, thereby causing the CPU 701 to execute coded processing.

The wireless communication device 703 receives the transmitted radio wave or transmits the radio wave. The configuration includes an antenna and a receiving device, and has a function to transmit and receive communications such as mobile communication (for example, 3G, 4G, 5G, PHS communications) and Wi-Fi (registered trademark) according to various communication standards.

The moving object I/F 704 controls the interface between the moving object 503 and the inside of the vehicle-mounted device 502 and controls input and output or data from the moving object 503. Therefore, the vehicle-mounted device 502 collects information from an ECU (including various sensors and the like) 707 included in the moving object 503 via the moving object I/F 704. The moving object I/F 704 may be, for example, a coupler used when coupled by wire or a near field communication (for example, Bluetooth (registered trademark)) device.

The receiving device (for example, a GNSS receiving device such as a Global Positioning System (GPS) receiving device) 705 receives radio waves from a plurality of satellites 505, and calculates the current position over the earth from the information included in the received radio waves.

The imaging device (such as a camera) 706 takes static images and dynamic images. For example, the configuration includes a lens and an imaging device. An image imaged by the imaging device 706 is stored in the memory 702. The imaging device 706, such as a camera, may have an image recognition function, a bar code or a QR code (registered trademark) reading function, an optical mark reader (OMR), an optical character reader (OCR) function, and the like.

As illustrated in FIG. 7, the GNSS receiving device 705 and the imaging device 706 may be included in the vehicle-mounted device 502, or may be included in the moving object 503 or separately provided externally. At this time, the data exchange between the GNSS receiving device 705 or the imaging device 706 and the vehicle-mounted device 502 may be performed by wired or wireless communication.

When the GNSS receiving device 705 or the imaging device 706 is not provided in the vehicle-mounted device 502, such information may be acquired via the moving object I/F 704 or the like. Although not illustrated, the vehicle-mounted device 502 may include various input devices, a display, an interface for reading and writing recording medium such as a memory card, various input terminals, and the like.

Figure 8:
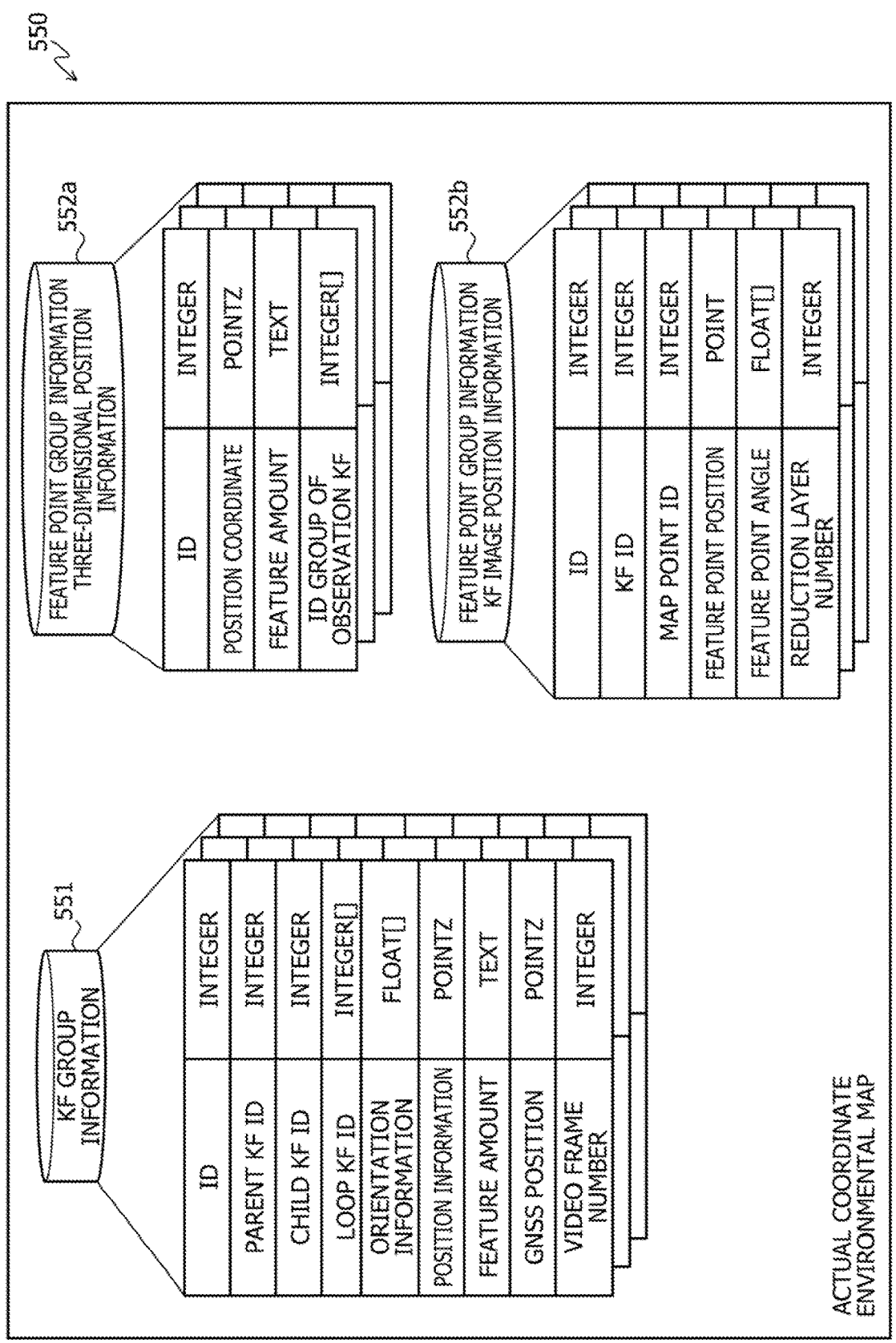
FIG. 8 is a diagram illustrating an example of a data configuration of an actual coordinate environmental map.

FIG. 8 is a diagram illustrating an example of a data configuration of an actual coordinate environmental map. In FIG. 8, the actual coordinate environmental map 550 includes the KF group information 551, a feature point group information (3D position information) 552a, and a feature point group information (KF image position information) 552b.

The actual coordinate environmental map 550 corresponds to the environmental map of the existing technology, and in addition to the 3D position of each image feature point (feature point group information (3D position information) 552a), it has information on which image feature point is browsed (or used) in which image. This is expressed by two, the feature point group information (KF image position information) 552b and the KF group information 551. The KF group information 551 which is information an image (KF) group in the main video, and the feature point group information (KF image position information) 552b which is information on a two-dimensional (2D) position where each image feature appears over the KF image are information significant for using the environmental map for position and orientation estimation of any image.

As illustrated in FIG. 8, the KF group information 551 has various information including "ID", "parent KF ID", "child KF ID", "loop KF ID", "orientation information", "position information", "feature amount", "GNSS position", and "video frame number".

"ID" is unique identification information for identifying the information of the KF, the "parent KF ID" and the "child KF ID" are information that links KFs, and the "loop KF ID" is information used in a loop closing processing or the like, that holds the KFs of each other as a reference when passing through the same place (loop) again.

The "orientation information" and the "position information" are estimated imaging position and orientation information of KF, the "feature amount" is a feature amount as a whole image used to determine whether or not an image is similar to a random image, the "GNSS position" is a GNSS position at the time of imaging the KF, which corresponds to input GNSS information newly, and the "video frame number" is the frame number of the corresponding video.

As illustrated in FIG. 8, the feature point group information (3D position information) 552a has various information including "ID", "position coordinates", "feature amount", and "ID group of observation KF".

The "ID" is unique identification information for identifying the feature point information, the "position coordinates" is the actual coordinate position coordinate of the estimated feature point, the "feature amount" is an image feature, and the "ID group of observation KF" is information on the KF in which the feature point appears and the "ID" of the corresponding KF information in the KF group information 551 is associated. The actual coordinate position coordinates may be held as local values as those to be actual coordinates using any actual coordinate transformation created by the initial orientation and coordinate system setting unit.

The feature point group information (KF image position information) 552b is information of an image feature point group extracted from the KF image, and there are two types: a feature point group having a 3D position, which is selected by simultaneous browsing from a plurality of KF images and a feature point group having no 3D position. The KF feature point group having no 3D position is used to evaluate in detail whether a random image is similar to the KF image, or is prepared and stored as a newly selected feature point group having a 3D position when a new KF image is obtained in the future.

As illustrated in FIG. 8, the feature point group information (KF image position information) 552b includes various information including "ID", "KF ID", "map point ID", "feature point position", "feature point angle", and "reduction layer number".

The "ID" is unique identification information for identifying the feature point information. The "KF ID" is information for identifying the KF from which the KF feature point is extracted, and the "ID" of the corresponding KF information in the KF group information 551 is associated. The "map point ID" is reference information to the feature point group information (3D position information) 552a, and the "ID" of the feature point information corresponding to the feature point group information (3D position information) 552a is associated. The "map point ID" is possessed only by a feature point group having a 3D position, which is simultaneously browsed and selected from a plurality of KF images, and does not have a feature point group that does not have a 3D position.

The "feature point position" and the "feature point angle" are, for example, information on the barycentric position and direction vector of the oriented FAST and rotated BRIEF (ORB) feature. The "reduction layer number" is information on the extraction status in the KF image. The "reduction layer number" is information on which of the reduced image group is extracted, for example, when assuming an ORB feature point calculated using a reduced image group obtained in a pyramid hierarchical manner while changing a reduction ratio as an image feature. These "feature point position", "feature point angle", "reduction layer number", and the like may be information matched to the feature when using another image feature.

In this way, the actual coordinate environmental map 550 is formed, and the KF group information and the feature point group information are associated and stored. In many cases, the feature point based V-SLAM environmental map includes images features and 3D position of the image feature point group, the information on the image KF browsing the feature point group, and the image feature group in the image KF to enable search for an image similar to the image KF. However, the actual coordinate environmental map 550 may be the same data as the V-SLAM environmental map of the related art except that the "GNSS position" is newly stored in the KF group information 551.

Figure 9:
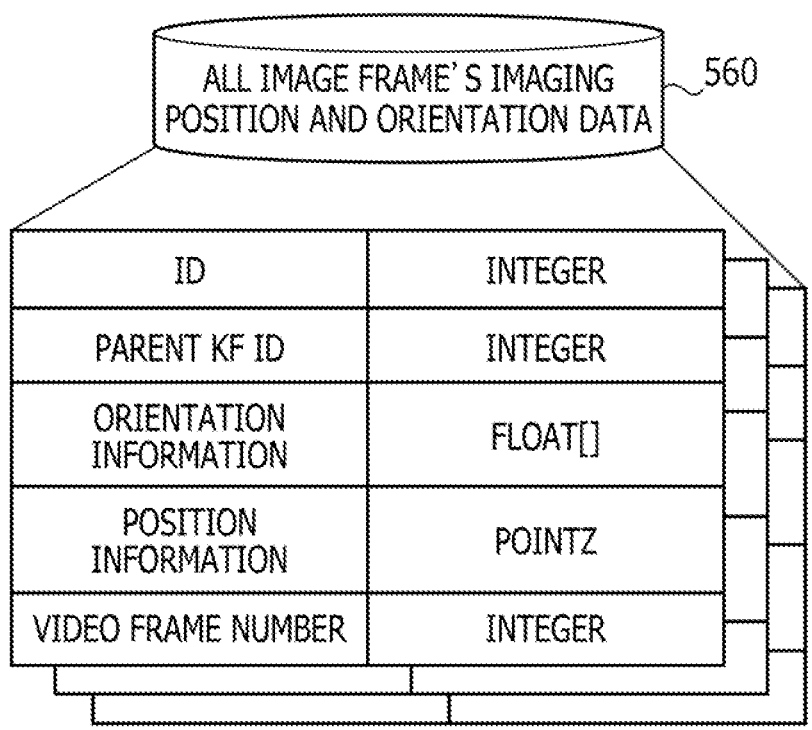
FIG. 9 is a diagram illustrating an example of a data configuration of all image position and orientation data.

FIG. 9 is a diagram illustrating an example of a data configuration of all image frame's imaging position and orientation data. The all image frame's imaging position and orientation data 560 holds the estimated imaging position and orientation for all the images in the video unlike the KF composed of the main images. The all image frame's imaging position and orientation data 560 corresponds to the imaging position and orientation of all images in the video of the existing technology.

As illustrated in FIG. 9, the all image frame's imaging position and orientation data 560 includes various information including "ID", "parent KF ID", "orientation information", "position information", and "video frame number". The "ID"" is unique identification information for identifying the position and orientation data. The "parent KF ID" is information of the KF that is visually close and refers to the position and orientation. The "orientation information" and "position information" are the relative position and orientation from the parent KF, and the "video frame number" is the frame number of the corresponding images/video.

The position and orientation information is held, for example, as a relative position and orientation with respect to the visually close KF, and is converted as actual coordinate values while reflecting the position and orientation of KF when the V-SLAM result is finally output. In this way, when processing V-SLAM sequentially, it is possible to easily calculate the positions and orientations of all the image frames according to the final positions and orientations of the KFs, without worrying that the position and orientations of the KFs change in the middle of the optimization processing. The position and orientation information may be held as local values in the actual coordinate values as well KF.

As understood from FIGS. 8 and 9, in this example, the information on the position and orientation of KF is held separately from the entire image frame position and orientation along with other information on the KF. The all image frame's camera pose (imaging position orientation) is the imaging position and orientation of the entire image frame of the video. Since the position orientation information of the KF included in the KF group information 551 of the actual coordinate environmental map 550 is the imaging position and orientation of the KF image which is some of image frames in the video, it may be included in the all image frame's imaging position and orientation data 560. The all image frame's imaging position and orientation data 560 may be the same data as the V-SLAM of the related art.

The position estimation system 500 of FIG. 5 (not illustrated) is may additionally hold various information for speeding up the V-SLAM calculation using the actual coordinate environmental map, as of the related art, in addition to the various information of the actual coordinate environmental map 550 and the all image frame's imaging position and orientation data 560 illustrated in FIGS. 8 and 9. For example, the relationship between KFs sharing the map feature point group having a 3D position in the image KF group, the relationship of the KF group having the largest number of sharing feature point groups among them, and the like may be maintained and each KF may be able to refer to each other.

For example, in ORB-SLAM, it may be a covisibility graph, and may be held as data of graph structure which uses KFs as nodes and KF groups sharing map feature points to edges, and map feature points that share edge weights. These may be used to speed up finding the optimization calculation target of the KF position and orientation and the environmental map by local mapping processing to be described later or searching for an image similar to the current image frame in a loop closing processing or the like.

Figure 10:
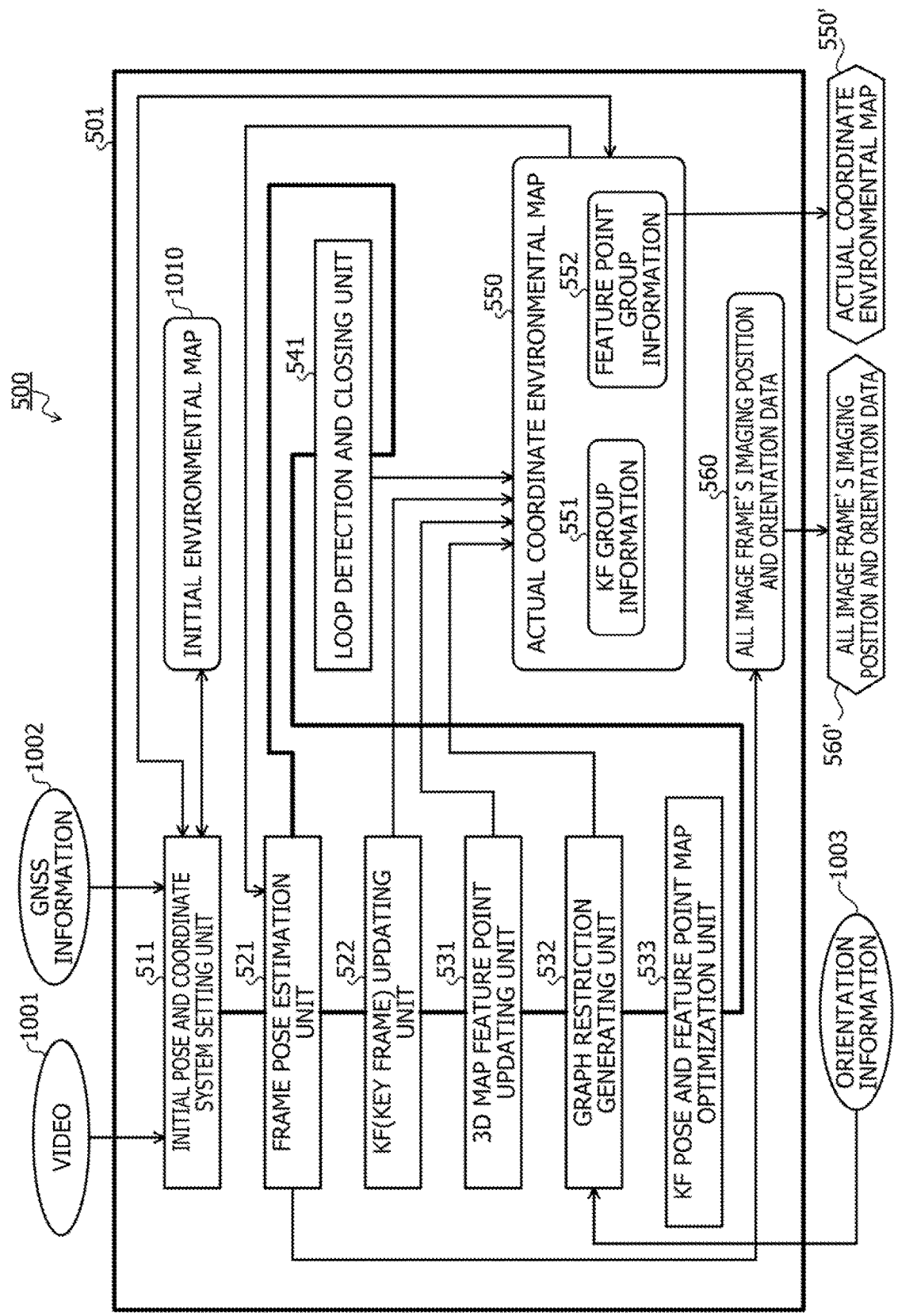
FIG. 10 is a diagram illustrating an example of contents of the position estimation system and the position estimation method according to the embodiment.

FIG. 10 is a diagram illustrating an example of contents of the position estimation system and the position estimation method according to the embodiment. In FIG. 10, input data of a video 1001 by a camera or the like, GNSS information 1002 acquired simultaneously with the video 1001, seven V-SLAM based processing units of the initial pose and coordinate system setting unit 511, the frame pose estimation unit 521, key frame (KF) updating unit 522, the 3D map feature point updating unit 531, the graph restriction generating unit 532, the KF pose and feature point map optimization unit 533, and the loop detection and closing unit 541, two internally held data of the actual coordinate environmental map 550 (KF group information 551, feature point group information 552) and the all image frame's imaging position and orientation data 560, and data of an initial environmental map 1010 may be included. Among these, at least one of the internally held data may be output as output data (actual coordinate environmental map 550', all image frame's imaging position and orientation data 560').

Since the position estimation system 500 according to the present embodiment is based on the V-SLAM technology of the related art, the same processing as the V-SLAM processing may be performed in part of the processing of each processing unit. In the present embodiment, a basic processing example of feature point base V-SLAM as the V-SLAM of the related art, especially ORB-SLAM using ORB feature is given, and the difference with the V-SLAM processing of the related art will be illustrated below.

Each information of the video 1001, the GNSS information 1002, and an orientation information 1003 is input into the position estimation system 500. The video 1001 and the GNSS information 1002 are input into the initial pose and coordinate system setting unit 511, and the orientation information 1003 is input into the graph restriction generating unit 532. However, the orientation information 1003 input into the graph restriction generating unit 532 is not required and may be omitted.

The video 1001 is a video imaged by the imaging device 706 included in the vehicle-mounted device 502 mounted on the moving object 503 such as a vehicle. It may be obtained by any method using communication unit of vehicles such as the vehicle-mounted device 502 or using man power through recording medium and may be input of the present system 500. In order to use it for distortion correction of a video, it is assumed that the internal parameters of the imaging device 706 that has imaged the video are known, and distortion correction is appropriately performed.

The GNSS information 1002 is the position of the moving object 503 at the time of imaging the video, and is data by any existing measuring unit such as GPS. It is obtained by any method equivalent to the video, and is used as an input of the present system 500.

The GNSS information 1002 is newly used to correct V-SLAM scale drift due to video. Although it is desirable to hold the GNSS information 1002 in all frames of the video as much as possible, it does not have to be held in all frames. As the number of frames to be held increases, it is possible to improve the position and orientation accuracy of the all image position orientation output by the present system and the actual coordinate environmental map.

As described later, at least two image frames near the video analysis start point used in the initialization of the present system is required to hold GNSS information, As the GNSS information is held as closely as possible, the initialization processing may be completed at an early stage from the start of the video, and the imaging position and orientation estimation processing may be performed.

Similarly, it is desirable that the GNSS information 1002 be as accurate as possible, and the higher the accuracy, the more accurate position and orientation of the output result of the present system may be. Although GNSS information is often a position such as a GPS receiver, it is desirable that it be transformed into camera position information as much as possible using the relative positional relationship between the GPS receiver and the camera.

The orientation information 1003 is camera orientation information obtained when a video is imaged, which is acquired from a random inertial measurement unit (IMU) or the like. IMU is, for example, an acceleration sensor, a gyro sensor, or the like. For example, a rotation angle, a roll, a pitch, a yaw angle, and the like with respect to coordinate axes such as the front, the upper right, vertically upward, and the like of own vehicle around the camera. Similar to the GNSS information, it may be held for all the images of the video, or may be held only for a random image.

The GNSS information 1002 and the orientation information 1003 may be obtained by once correcting each camera imaging position and orientation estimated by V-SLAM by any method such as manual work and reading the corrected each camera imaging position and orientation again as the GNSS information 1002 and the orientation information 1003 of the same video instead of obtaining separately from the sensor group as described above.

Even if the camera imaging position, which is the output result of the V-SLAM of the related art, is manually corrected, the surrounding environmental map (feature point group) may not be corrected accordingly. However, in the present system, it is possible to perform estimation that appropriately merges and reflects both the position according to the input GNSS information 1002 and the position according to the analysis result of video 1001 by a unique local mapping function described later. Therefore, according to the present system, it is possible to create an actual coordinate environmental map including feature point groups smoothly according to the manually corrected result through re-execution using the manually corrected output result as an input.

Since the orientation information is estimated and output together with the position information without inputting the orientation information at the first execution time, at the re-execution time, the estimated orientation information may also be input and used together with the position information, but only the position information may be used as an input without using the orientation information. For example, since the two pieces of information differ in their certainty in a case where the orientation information may not be manually corrected at all unlike the manually corrected position information, it is possible to create an actual coordinate environmental map input and using only the position information at the time of re-execution without using the estimated orientation information with low accuracy.

The actual coordinate environmental map 550' which has been output once may be used again as an input. For example, since there is no actual coordinate environmental map when estimating the imaging position and orientation of the first traveling video of a runway, the processing in the present system is executed without input of the actual coordinate environmental map. Next, when estimating imaging position and orientation of the second and subsequent traveling videos traveling on the same runway, the actual coordinate environmental map 550' output as a processing result of the first traveling video may be input and used as if it was internal data created in the processing of the video. At this time, in the first and second and subsequent traveling videos, the vehicle to be imaged, the camera, the position in the traveling lane, and the like may be different. When the actual coordinate environmental map 550' is input, the input of the GNSS information 1002 may be omitted.

When the vehicle-mounted device 502 includes at least one of the functional units 511, 521, 522, 531, 532, 533, and 541, the video 1001 and the GNSS information 1002 may be held inside the vehicle-mounted device 502 to process V-SLAM.

In the following description of the present system, there will be no actual coordinate environmental map input unless otherwise specified, and the case of creating an actual coordinate environmental map from scratch (when the input of the GNSS information 1002 is required) will be described. As the GNSS information 1002, the value of a plane rectangular coordinate system is described as an example.

The initial pose and coordinate system setting unit 511 in charge of the initialization processing function 510 in the system creates internal data required for processing functions such as tracking afterward as initialization processing, as well as determining the coordinate system to be calculated. For example, in addition to estimating the 3D position of the feature point group in the vicinity of the place at the start of the video, the initial KF position and orientation are estimated, so that the actual coordinate environmental map in the vicinity of the place at the start of the video, which is the minimum required for subsequent processing is created. Among the processing of the initial orientation and coordinate system setting unit, the same processing as the initialization processing of V-SLAM of the related art may be performed other than the determination processing of the coordinate system used for calculation. It may be also the same as the V-SLAM of the related art that the process including the frame orientation estimation is not performed unless this initialization processing is completed.

The initial pose and coordinate system setting unit 511 may realize its function, for example, by the CPU 601 executing a program stored in the memory 602 illustrated in FIG. 6. For example, the CPU 701 may execute the program stored in the memory 702 illustrated in FIG. 7 to realize the function.

The initial pose and coordinate system setting unit 511 first obtains a random image feature group for each image of the distortion corrected video. Next, feature points (pairs of feature points of each image) simultaneously appearing in the first two frames are searched from each image feature group. The pair search method depends on the image feature to be used, and may use a search method of the same feature pair of two existing images. When the calculated number of pairs is sufficiently large, the image change of the feature point group is used to estimate the position and orientation change of the camera and the 3D position of each feature point group that appears common to the two images.

Using an existing method, for example, a method using a geometric models such as Homography assuming a plane and a basic matrix assuming nonplane, transformations representing changes in camera position and orientation of two images is estimated from the change in position and orientation of each feature point pair appear in two image, and the 3D position of each feature is estimated from the estimated camera position and orientation of two images and the position over each image of each feature pair using an existing method such as triangulation.

When the number of pair is insufficient, the processing is performed by changing one of the two images (for example, an image of later time) to another image (for example, image of time after that). The first two frames to be used may not be strictly the image at the start of the video, but may be any two frames in which the same subject may appear. For example, if it is known that the video is imaged during a stop, an image seems that the camera imaging position has been changed may be selected as a later time image.

At this time, instead of calculating the 3D positions of all feature point group pairs, a random feature point may be selected such as omitting feature points with large errors compared to other feature point groups, thinning out feature point groups in an image portion where feature point groups are concentrated in order to obtain a prescribed number of feature points evenly in the entire image, or omitting feature points where the angle (angle of intersection) between the position of two cameras and the feature points are small.

The initial pose and coordinate system setting unit 511 may further perform processing for optimization calculation as in the V-SLAM of the related art, and may add processing of updating the calculated value to a more accurate value. For example, for each of the two images, the camera position and the 3D position of the feature point group are known, and it is possible to calculate how the feature point group is reflected in each image. The difference between the reflection position feature point group to each image and the position of the feature point in the actual camera image (called reprojection error) may be examined, and optimization correction (bundle adjustment (BA)) may be performed to finely adjust the feature points and the camera position and orientation in order to minimize the reprojection error of the feature point group.

Next, the initial pose and coordinate system setting unit 511 creates an initial environmental map 1010 from the calculation result. For example, the used two images are registered in the initial environmental map 1010 as KF with the estimated image imaging position and orientation, and the information (position over two images, 3D position) on the estimated feature point group is also registered in the initial environmental map 1010. The initial environmental map 1010 estimates the KF position and orientation and the 3D position of the feature point group by a method slightly different from the method performed by the functional units such as tracking and local mapping in the initialization processing, so the accuracy is slightly low.

In the processing of calculating the initial values of the camera position and orientation of these two images and the 3D position of the feature point group around the vehicle, as in the V-SLAM of the related art, the camera position and orientation (hereinafter, referred to as "initial camera position and orientation") of one (many are earlier images, hereinafter, referred to as "initial camera image") of the two images may be calculated in a local system with an origin and a reference coordinate system.

For example, in many cases, a pixel coordinate system for indicating a pixel position over an image used in image processing often uses an image lateral direction of an imaged image as X, and an image downward direction as Y. Therefore, the camera position of the initial frame is set as the origin (0, 0, 0) to make the V-SLAM of the related art also have a similar reference coordinate system. In many cases, it is defined as a right-handed system (SLAM local system) of vehicle's right hand direction X, vehicle's vertically downward direction Y, and vehicle's forward direction Z. In the present system, the camera position and orientation of two images and the 3D position of the feature point group commonly appearing in the two images are calculated in this SLAM local system.

As described above, the initial pose and coordinate system setting unit 511 performs processing of creating (estimation of KF position and orientation and estimation of 3D position of feature point group) the initial environmental map 1010 as in the V-SLAM of the related art.

Next, the initial pose and coordinate system setting unit 511 obtains GNSS position coordinate values corresponding to two images from the input GNSS information and calculates a transformation matrix of the SLAM local (coordinate) system and the actual coordinate system in order to make the KF imaging position and orientation of the environmental map calculated in the SLAM local coordinate system and the 3D position of the feature point group correspond to the actual coordinate system.

Figure 11B:
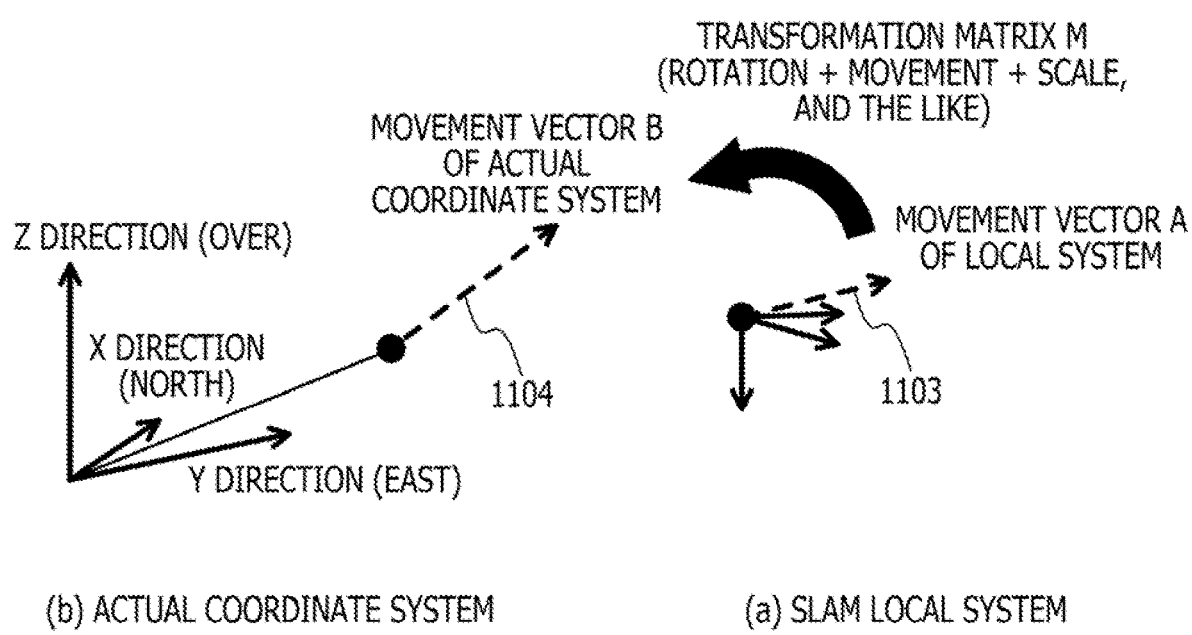
FIG. 11B is a diagram illustrating an example of transformation matrix calculation in an initial orientation and coordinate system setting unit.
Figure 11C:
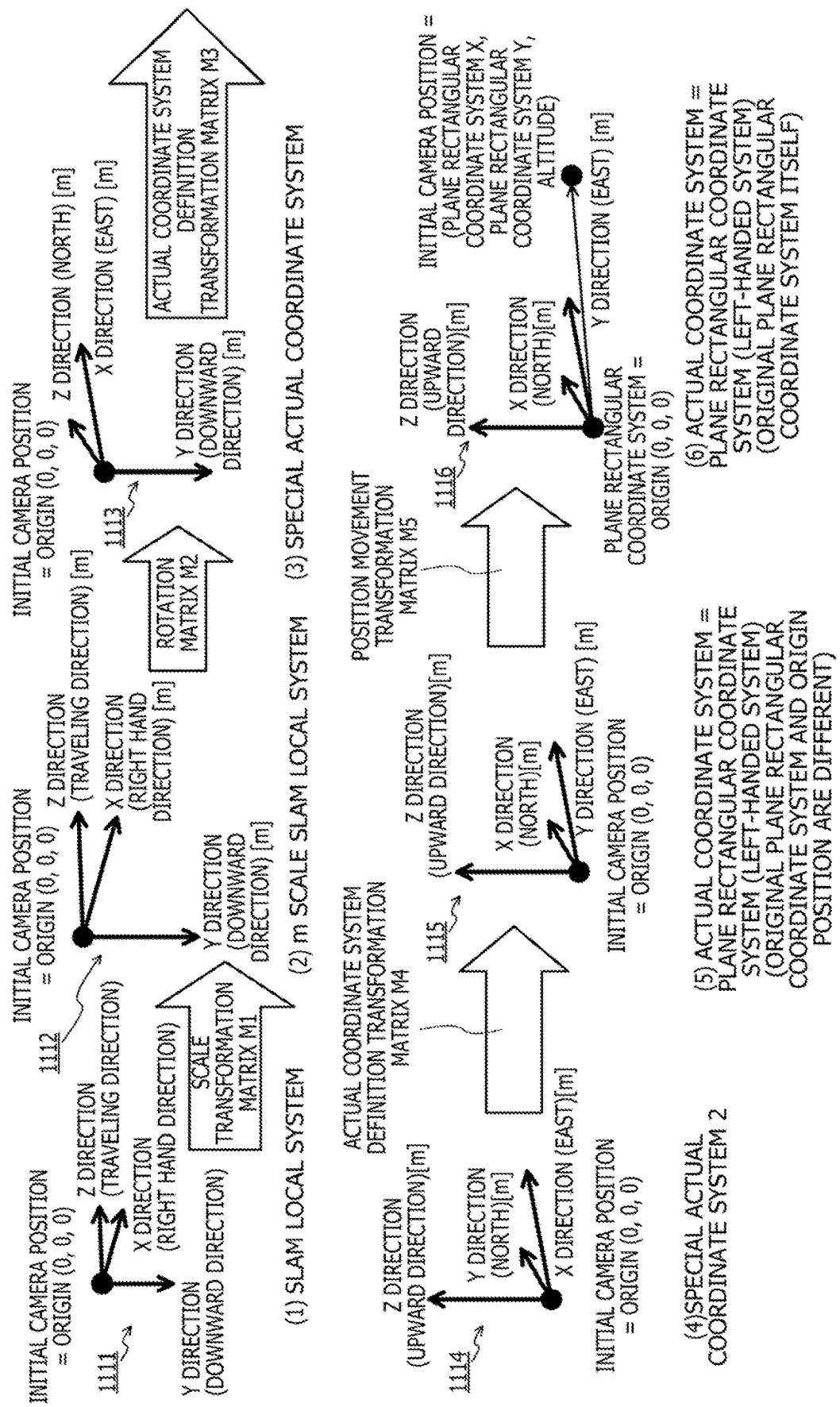
FIG. 11C is a diagram illustrating an example of transformation matrix calculation in an initial orientation and coordinate system setting unit.

FIGS. 11A to 11C are diagrams illustrating an example of transformation matrix calculation in the initial pose and coordinate system setting unit 511. As illustrated in FIG. 11A, a plane rectangular coordinate system is used as an actual coordinate system in the present system 500. For example, reference numeral 1101 indicates (a) a SLAM local system (right-handed system). For example, with respect to the origin (initial camera), the X direction indicates the right hand direction, the Y direction indicates the downward direction, and the Z direction indicated the traveling direction.

On the other hand, reference numeral 1102 indicates (b) an actual coordinate system, for example, a plane rectangular coordinate system (left-handed system). For example, with respect to the plane rectangular coordinate system origin (0, 0, 0), the X direction indicates "north", which is a plane rectangular coordinate system X value[m], the Y direction indicates "east", which is a plane rectangular coordinate system Y value[m], and the Z direction indicates "up", which is the altitude value[m].

However, this is only an example, and it is possible to use any right-handed coordinate system instead of using a left-handed plane rectangular coordinate system different from the right-handed SLAM local system of the V-SLAM of the related art.

FIG. 11B illustrates a movement vector. Reference numeral 1103 denotes a movement vector A of the local system, and reference numeral 1104 denotes a movement vector B of the actual coordinate system. A movement vector is a traveling direction vector indicating the difference (F2−F1) between "position of the later time frame (F2) between the any two image frames" and "position of the earlier time frame (F1) between the any two image frames". As illustrated in FIG. 11B, the same movement vector is represented by two coordinate systems (movement vector A1103 and movement vector B1104). Therefore, the initial pose and coordinate system setting unit 511 calculates a transformation matrix (transformation matrix M from local system to actual coordinate system) to be transformed to the value of another system.

FIG. 11C illustrates the contents of the transformation matrix M for transforming the SLAM local system into the values of the actual coordinate system. In FIG. 11C, the transformation matrix M for transforming the SLAM local system to the values of the actual coordinate system consists of an integration of five matrices: a scale transformation matrix. M1 for absorbing scale differences between coordinate systems, a rotation matrix M2 for transforming coordinate axes from a system derived from the traveling direction to a system derived from latitude and longitude, M3 to change the XYZ coordinate axis definition to a different value, M4 to transform from the right-handed system to left-handed system values, and M5 to transform the origin from the initial camera position to the value changed to the origin of the plane rectangular coordinate system.

The scale transformation matrix M1 is a transformation matrix that transforms any scale due to an image change into a scale of actual coordinates. The scale transformation matrix M1 may transform (1) a SLAM local system 1111 into (2) an m scale SLAM local system 1112.

FIG. 11D is a diagram illustrating an example of calculation of the scale transformation matrix M1 for transforming a random scale derived from image change into the scale[m] of the coordinate system of latitude and longitude.

In FIG. 11D, first, from two image camera positions Q1 (corresponding to previous time image F1) and Q2 (the following time F2) of the SLAM local system, the movement vector A1103 which is the difference (each position difference, Q2−Q1) is calculated. The component definition may be the SLAM local system itself (V-SLAM output value of the related art).

Next, from two images of the GNSS position S1 (corresponding to previous time image F1) and S2 (the post time image F2), the movement vector B1104 (=S2−S1) of a special actual coordinate system using values of the actual coordinate system (right-angled plane coordinate system) but having different component (axis) definitions is calculated. The special actual coordinate system is (X component=longitude coordinate value difference of east is +, Y component=−(altitude value difference), and Z component=latitude coordinate difference of north is +).

The magnitude of the movement vector A1103=lenA and the magnitude of the movement vector B1104=lenB are obtained. From the calculated magnitudes, the magnitude Rate=(lenB/lenA) is obtained, and a scale transformation matrix which is multiplied by the rate is obtained as the scale transformation matrix M1. When Eye (m, n) is expressed as an m-by-n unit matrix, the scale transformation matrix M1 is M1=Rate×Eye (3, 3).

Returning to FIG. 11C, the rotation matrix M2 is a transformation matrix that changes the coordinate system derived from the traveling direction to the system derived from the latitude and longitude. The rotation matrix M2 may transform (2) the m scale SLAM local system 1112 into (3) a special actual coordinate system 1113.

Figure 11E:
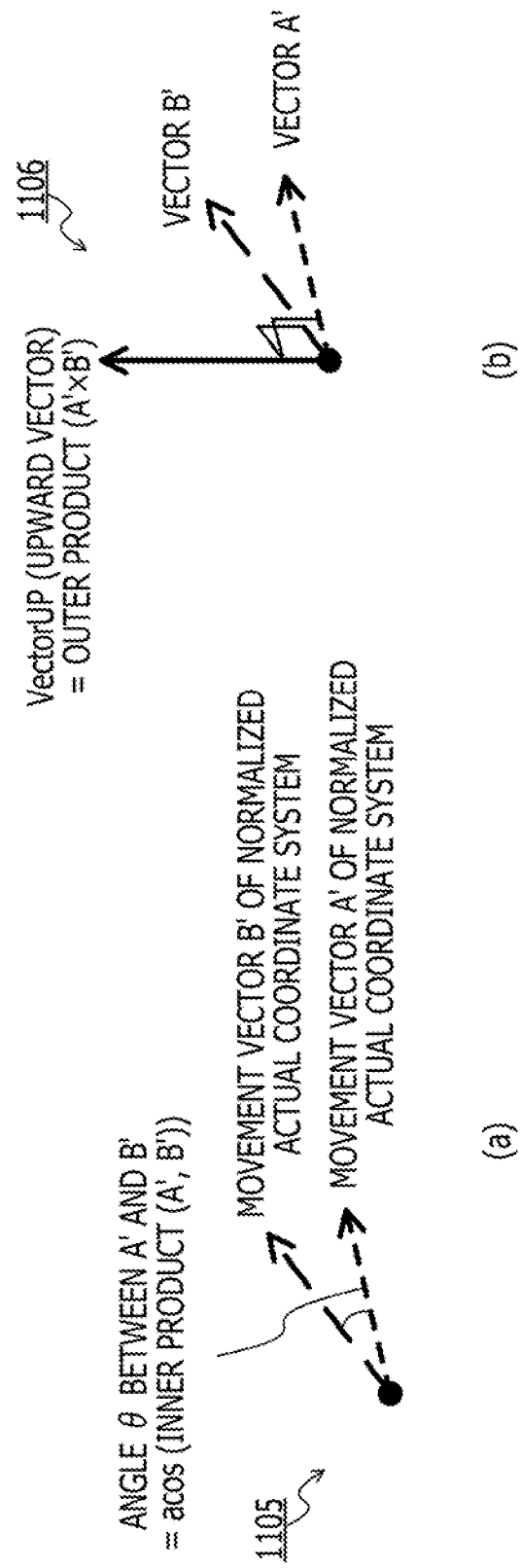
FIG. 11E is a diagram illustrating an example of calculation of a rotational transformation matrix M2.

FIG. 11E is a diagram illustrating an example of calculation of the rotational transformation matrix M2. In FIG. 11E, first, the movement vector is divided by each length to obtain a movement vector A'=A/lenA of the normalized local system and a movement vector B'=B/lenB of the normalized actual coordinate system.

Next, as indicated by reference numeral 1105, (a) an angle Θ formed from the vector A' to the vector B' is obtained from the inner product.

$$\Theta = a\cos(\text{inner product}(A', B'))$$

As indicated by reference numeral 1106, and (b) an upward vector (VectorUP), which is the outer product of the vector A' and the vector B'=A'×B', is obtained to calculate an angle Θ' in consideration of the direction. When the Y value of the upward vector is positive, angle Θ'=−Θ, and when it is negative, angle Θ'=Θ.

Since the transformation of the axis definition and the transformation of the coordinate values are reversed, a (−Θ') rotation matrix around the Y axis is set to the matrix M2.

Returning to FIG. 11C, the actual coordinate system definition transformation matrix M3 is a transformation matrix that rotates −90 degrees around the X axis. The actual coordinate system definition transformation matrix M3 may transform (3) the special actual coordinate system 1113 into (4) a special actual coordinate system 2, 1114.

The actual coordinate system definition transformation matrix M4 is a transformation matrix that transforms a right-handed system to a left-handed system. X and Y are transformed to each other. The actual coordinate system definition transformation matrix M4 may transform (4) the special actual coordinate system 2, 1114 to (5) an actual coordinate system, for example, a plane rectangular coordinate system (left-handed system) 1115. The original plane rectangular coordinate system and the origin position are different.

The position movement transformation matrix M5 is a transformation matrix for moving the origin position. For example, the initial actual coordinate position of the camera (initial camera position) is translated, and the initial camera position=plane rectangular coordinate system X[m], plane rectangular coordinate system Y[m], and altitude [m]. The position movement transformation matrix M5 may transform (5) the plane rectangular coordinate system (left-handed system) 1115 to (6) an original plane rectangular coordinate system (left-handed system) 1116.

In this way, the SLAM local system 1111 (1101 illustrated in FIG. 11A) may be transformed to the actual coordinates (plane rectangular coordinate system (left-handed system)) 1116 (1102 illustrated in FIG. 11A).

By holding this coordinate system transformation matrix M, the initial pose and coordinate system setting unit 511 may transform the initial environmental map in the SLAM local coordinate system, which has been calculated similarly to the V-SLAM of the related art, into an actual coordinate environmental map of the plane rectangular coordinate system. As a result, it is possible to unify the scale of the SLAM local system derived from the image and meaningless in particular size to the m unit real coordinate scale by using it in the present system.

The initial pose and coordinate system setting unit 511 may transform not only the transformation matrix but also the 3D initial position of the feature point group that has actually been calculated and the imaging position and orientation position of two images into values in the actual coordinate system using this transformation matrix, if it is required. For example, the position of the feature point group frequently referred to is desirably held as a value of the actual coordinate system, since it is used as a unified value before and after reinitialization when a tracking processing function (frame orientation estimation) fails, which will be described later. If the values are held in advance as values of the actual coordinate system, the projection position over each image may be calculated without the transformation.

On the other hand, in actual coordinate systems such as a plane rectangular coordinate system, the numerical values are often very large. Therefore, the transformation matrix may be used to transform the values of the actual coordinate system when it is required only by holding the feature point group 3D position of the environmental map with the same value of the local coordinate system as in the related art and additionally holding the transformation matrix newly. Alternatively, even if it is a value of an actual coordinate system, it may be a difference value from an appropriate initial value.

In the present system 500, it is described that after setting the initial orientation and coordinate system in the same local coordinate system as before, information for transformation to the actual coordinate system is created, and all subsequent 3D coordinate values are held as values of the actual coordinate system subjected to the actual coordinate transformation.

When inputting an existing actual coordinate environmental map, the processing of the initial pose and coordinate system setting unit is skipped, and the same processing as the subsequent processing is performed with the input actual coordinate environmental map as the initial actual coordinate environmental map.

In the present system 500, as in the V-SLAM of the related art, when the processing of the initial pose and coordinate system setting unit 511 is performed on two images (initial KF), it is assumed that the initialization has been completed, and the subsequent processing is sequentially performed on the images not yet processed. Therefore, the subsequent processing is not performed on the two images (initial KF) used for initialization, and is performed on the subsequent images.

The tracking processing function, the mapping processing function, and the loop closing processing function, which are the subsequent processes, are processed in a sequential manner for simplifying description, in practice, simultaneous processing using a plurality of threads may be used. In that case, since each processing function cross-references the KF position and orientation held internally and the actual coordinate environmental map, it is possible to avoid simultaneous editing in a plurality of processing using an existing editing lock function or the like as appropriate. Each processing function sequentially processes each image of the video until there is no image to be processed.

In FIG. 10, the frame pose estimation unit 521 in charge of the position and orientation estimation (tracking) processing function 520 performs the same processing as that of the V-SLAM of the related art except for the handling processing when the normal processing fails (processing when relocalization fails, which will be described later). For example, the frame pose estimation unit 521 calculates an image feature group with respect to the input new image (distortion corrected) moved by the camera, and obtains the position of a calculated 3D feature point group that is considered to be the same feature point (actual coordinate environmental map 550) by comparing image feature amounts.

At this time, the initial position and orientation of a new image camera assumed as constant speed traveling are estimated, and the 3D feature point group used in the previous image is projected over the new image using the estimated initial position and orientation. By searching for corresponding feature points in the vicinity thereof, candidates for 3D feature points that are considered to be the same feature points may be narrowed down.

After that, the position and orientation of the new image camera are optimized so that the reprojection error over the new image becomes smaller for the entire 3D feature point group found as the same feature point. For example, BA is performed in which only the camera position and orientation are optimized without changing the position of the 3D feature point group. Subsequently, a first KF group sharing the new image with the 3D feature point group is searched, and a second KF group sharing the 3D feature point group with the first KF group 1 is searched. Thereby, the 3D feature point groups of the first KF group and the second KF group are obtained.

At this time, the selected 3D feature point group may be randomly selected using the distance (within the prescribed distance range) from the camera position of the new image, the difference in the browsing direction from the camera (for example, the inner product of the browsing direction vector from the camera position of the new image to the 3D feature point and the browsing direction vector from the camera position of the current. KF group to the feature point is greater than or equal to a prescribed value), or the like. Using more 3D feature point groups obtained from the first KF group and the second KF group, the frame pose estimation unit 521 projects again over the new image and executes position and orientation optimization such that the reprojection error becomes smaller.

The frame pose estimation unit 521 may realize its function, for example, by the CPU 601 executing a program stored in the memory 602 illustrated in FIG. 6. For example, the CPU 701 may execute the program stored in the memory 702 illustrated in FIG. 7 to realize the function.

In the case where position and orientation estimation fails because the frame pose estimation unit 521 may not obtain sufficient 3D feature point groups, and the like, as in the V-SLAM of the related art, relocalization processing which is position and orientation return processing may be performed. In the relocalization processing, if all KF groups are searched for KF similar in image characteristics and similar KF candidate groups are found, 3D feature point groups of those. KFs are matched with feature point groups of the new image, and the KF having a large number of matching may be selected as a final KF.

The relocalization processing then performs initial position and orientation estimation by solving the known PnP problem using a smaller number of feature points, using the matched feature point groups of the KF and the new image. From newly obtained initial position and orientation of the new image's camera, using any optimization method, such as nonlinear least squares with more feature point group, the corrected position and orientation are performed set as the estimated camera position and orientation of the new image.

Up to this point, the frame pose estimation unit 521 of the present system 500 performs the same processing as that of the V-SLAM of the related art. On the other hand, the frame pose estimation unit 521 of the present system 500 differs from the V-SLAM of the related art in the processing when the above-described relocalization processing also fails. When the relocalization process also fails, the V-SLAM of the related art may not continue the processing, so the processing ends. However, in the case of the present system 500, the processing returns to the initial pose and coordinate system setting unit 511 instead of processing completion, and the initialization processing may be re-executed with the internal calculation data such as the existing actual coordinate environmental map 550 and the all image frame's imaging position and orientation data 560 remaining.

In the V-SLAM of the related art, relocalization failure means that the correspondence with the image and KF group which has been tracked until now may not be obtained at all. As described above, since the V-SLAM of the related art is a coordinate system related to the initial image frame used by the SLAM local system to calculate for initialization, once the correspondence is lost, after that, even if the initialization processing is performed again, the calculation is started in the coordinate system of a new other initial image frame different from the environmental map calculated until now. Therefore, between the result obtained until it is substantially impossible to handle and the result obtained after starting the initialization again, the correspondence between the environmental map to be calculated and the values of the position and orientation of the camera may not be obtained, and this will result in substantial fragmentation.

In the V-SLAM of the related art, when relocalization fails, there is no point in performing initialization processing, and therefore, the processing is ended without performing the initialization processing. However, in the present system 500, since the coordinate system and V-SLAM values after initialization may be all real coordinate systems as initialization processing, even if the correspondence between the image being tracked and the KF group may not be obtained, the values of the environmental map and the camera position and orientation to be calculated are consistent values, as long as they are the values of the actual coordinate system.

Accordingly, the environmental map and camera position and orientation values calculated before and after initialization do not have any problem even if they are both mixed and held. Therefore, in the present system 500, unlike the V-SLAM of the related art, when the relocalization fails, the process by the initial pose and coordinate system setting unit 511 is performed again. At this time, as described above, if the 3D position of the feature point group that is referred to in large numbers and frequently is held as a value of the SLAM local coordinate system and a transformation matrix to the actual coordinate system, each time the initialization processing is performed, both values may change (value of the accumulated actual coordinate system is the same), which is troublesome. Therefore, it is desirable to keep the value of the actual coordinate system as much as possible.

In FIG. 10, the KF (key frame) updating unit 522 in charge of the position and orientation estimation (tracking) processing function 520 determines whether a new image frame is required to be KF as an image feature like the V-SLAM of the related art. The KF updating unit 522 of the present system 500 additionally selects a KF image frame using whether or not the image frame holds the GNSS position. For example, when some image frames have no GNSS position and image frames without GNSS position continue a prescribed number or more, when an image frame having a GNSS position is input as a new image frame, the new image frame is adopted as a new KF regardless of the result of image characteristic determination of the related art.

The determination of whether using the image frame as KF due to the image characteristic of the V-SLAM of the related art is, for example, when the elapsed time from the last KF or the number of elapsed frames exceeds the prescribed value, when the number of shared 3D feature point groups with the KF sharing the most number of 3D feature point groups with the new image among the KF group 1 acquired by the frame orientation estimation unit is equal to or less than the prescribed number, and the like. After that, the KF updating unit adds the newly determined image frame, which is regarded as the KF, to the KF group of the actual coordinate environmental map. As described above, when a graph structure (KF group 1) is separately held between KF groups sharing feature points, the graph structure is updated also for the newly added KF (new image) as appropriate.

The KF updating unit 522 may realize its function, for example, by the CPU 601 executing a program stored in the memory 602 illustrated in FIG. 6. For example, the CPU 701 may execute the program stored in the memory 702 illustrated in FIG. 7 to realize the function.

Figure 12:
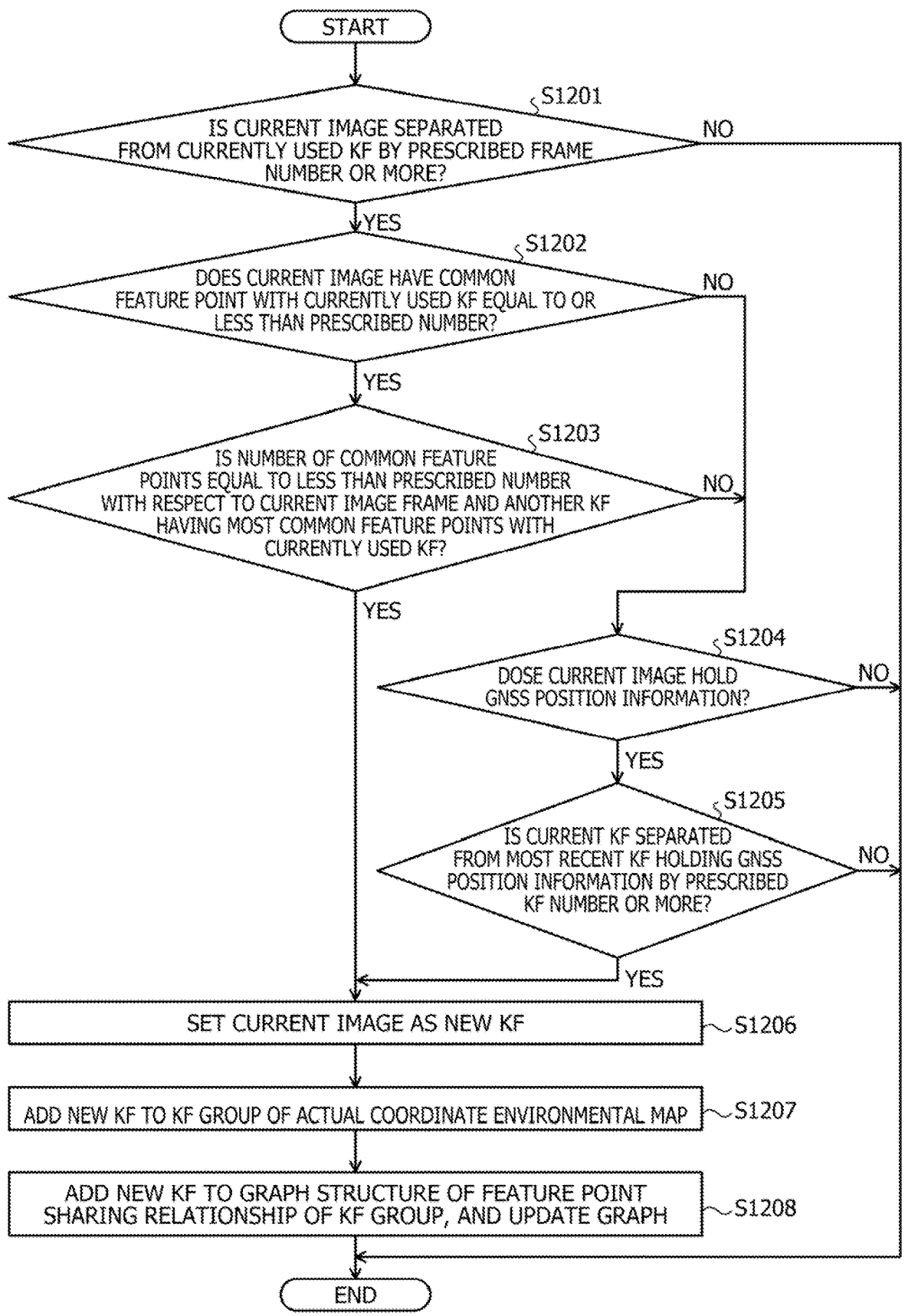
FIG. 12 is a flowchart illustrating an example of a processing procedure of a key frame (KF) updating unit.

FIG. 12 is a flowchart illustrating an example of a processing procedure of the KF updating unit. In the flowchart of FIG. 12, the KF updating unit 522 determines whether the current image frame is separated from the currently used KF by the prescribed frame number or more (step S1201). When it is determined that it is not separated by the prescribed number of frames or more (step S1201: NO), the series of processing is ended without doing anything.

On the other hand, when it is separated by the prescribed number of frames or more (step S1201: Yes), it is then determined whether the current image frame has the common feature point with the currently used KF equal to or less than the prescribed number (step S1202). When the number of common feature points is not equal to or less than the prescribed number (step S1202: No), the processing proceeds to step S1204. On the other hand, when the number of common feature points is equal to or less than the prescribed number (step S1202: Yes), then it is determined whether the number of common feature points is equal to or less than a prescribed number with respect to the current image frame and another KF having the most common feature points with the currently used KF (step S1203).

In step S1203, when the number of common feature points is not equal to or less than the prescribed number (step S1203: No), the progressing proceeds to step S1204. On the other hand, when the number of common feature points is equal to or less than the prescribed number (step S1203: Yes), the progressing proceeds to step S1205. Next, in step S1204, it is determined whether the current image frame holds GNSS position information (step S1204). When the GNSS position information is not held (step S1204: No), a series of processing ends. On the other hand, when GNSS position information is held (step S1204: YES), the processing proceeds to step S1205.

In step S1205, it is determined whether the current KF is separated from the most recent KF holding GNSS position information by the prescribed KF number or more (step S1205). When it is separated from the newest KF by the prescribed KF number or more (step S1205: Yes), the processing proceeds to step S1206. On the other hand, when it is not separated (step S1205: No), the series of processing ends.

In step S1206, the current image frame is set as a new KF (step S1206). A new KF is added to the KFs of the actual coordinate environmental map (step S1207). A new KF is added to the graph structure of the feature point sharing relationship of the KF group, and the graph is updated (step S1208) This completes the series of processing.

Only the KF addition determination is performed by one of the processing units (for example, KF updating unit 522) in charge of the tracking processing function 520, and the actual KF addition processing is made independent, thereby, it may be performed by any of the processing units 531 to 533 in charge of the local mapping processing function 530.

In the present system 500, the KF addition processing has been described as being performed by the KF updating unit 522. However, the tracking processing function 520 is processing for all image frames. Therefore, if attention is paid to the fact that local mapping processing is a process for processing every KF, it is preferable that the local mapping processing function 530 performs only the determination whether or not to execute the KF addition processing by either of the processing units 521 and 522 in charge of the tracking processing function 520, and the actual KF addition processing may be performed by any of the processing units 531 to 533 that is in charge of the local mapping processing function 530. Also in the V-SLAM of the related art, the KF addition processing itself is often performed by one of the processing units 531 to 533 that is in charge of the local mapping processing function 530.

The 3D map feature point updating unit 531 in charge of the environmental map creation (local mapping) processing function 530 performs the removal determination of the recently added 3D map point using the added KF, as in the V-SLAM of the related art, and performs new 3D map point addition processing.

The 3D map feature point updating unit 531 may realize its function, for example, by the CPU 601 executing a program stored in the memory 602 illustrated in FIG. 6. For example, the CPU 701 may execute the program stored in the memory 702 illustrated in FIG. 7 to realize the function.

As a 3D map point removal determination processing, the 3D map feature point updating unit 531 determines whether a 3D map point is used based on whether or not the recently added 3D map point group may be browsed from equal to or more than a prescribed number of KF in the entire KF group including the newly added KF. When it is determined that the 3D map point is not used, the 3D map point is removed.

In the 3D map feature point updating unit 531, only the removal determination is performed and the actual removal processing may be performed simultaneously with the processing of separately investigating in detail whether or not to use 3D map points such as BA of the subsequent KF pose and feature point map optimization unit 533.

As a new 3D map addition processing, the 3D map feature point updating unit 531 searches the added new KF for feature points that do not correspond to the 3D feature point group, and searches for the same feature point from the image feature amount and the unmatched feature point of the first KF group sharing the feature point with the new KF updated by the KF updating unit 522. At this time, whether or not the feature points are the same may be further narrowed down by any method such as epipolar restriction or reprojection error in the KF. When the same feature point is found, the 3D position of the feature point is obtained using a known triangulation method, and is added to the actual coordinate environmental map as a new 3D feature point using the two KF camera positions and the same in-image position of the same feature point appearing in the image over the KF.

Since the graph restriction generating unit 532 in charge of the environmental map creation (local mapping) processing function 530 is a processing unit to perform the preparation for executing a processing of correcting in advance the position of the current KF and the 3D position of the surrounding feature point group according to the input GNSS information using a pose graph, before performing the processing (local BA) in which the current KF and the surrounding feature point group 3D positions are obtained by BA in the subsequent KF pose and feature point map optimization unit 533 as in the related art.

The graph restriction generating unit 532 may realize its function, for example, by the CPU 601 executing a program stored in the memory 602 illustrated in FIG. 6. For example, the CPU 701 may execute the program stored in the memory 702 illustrated in FIG. 7 to realize the function.

The concept of a pose graph and the optimization calculation itself using a graph structure may be the same as optimization calculations based on general graph theory (pose graph structure), and may use an existing optimization library such as general graph optimization (g2o).

The graph restriction generating unit 532 makes use of this general graph structure, and creates two pose graphs with different optimization targets (nodes) and constraint conditions (edges) for two-stage optimization: optimization of only the KF position and orientation (general optimization of KF information group in actual coordinate environmental map) and optimization of position and orientation using both the KF group after the optimization and surrounding feature point groups (detailed optimization of entire actual coordinate environmental map).

In the present system 500, optimization in accordance with GNSS information is performed in two stages of optimization with only KF pose and orientation and optimization with surrounding feature point group, but this is an example. Optimization may be performed only once using the KF position and surrounding feature groups, optimization of only the KF group may be performed once again to perform three-stage optimization, or the order may be changed. At this time, the number of stages of this optimization may be changed for each KF. Instead of optimization of the position and orientation of the KF group, optimization of either the position of the KF group or the orientation of the KF group may be performed.

Because the number of KF groups to be optimized is smaller than that of surrounding feature point groups, in the present system 500, first, after roughly correcting the KF position and orientation sufficiently with the GNSS position, two stages of optimization including surrounding feature point groups are performed in order to avoid the correction effect by the restriction condition by the GNSS position which is the position of KF becoming ineffective.

In order to optimize the position and orientation of the new KF in the first stage and the KF group in the vicinity, and to optimize the position including the surrounding feature point group in the second stage, the graph restriction generating unit 532 creates a graph structure in which a new constraint condition is introduced that minimizes the deviation between the estimated 3D position of the KF group and the GNSS position (3D position) corresponding to the KF input as GNSS information unlike V-SLAM of the related art.

Figure 13B:
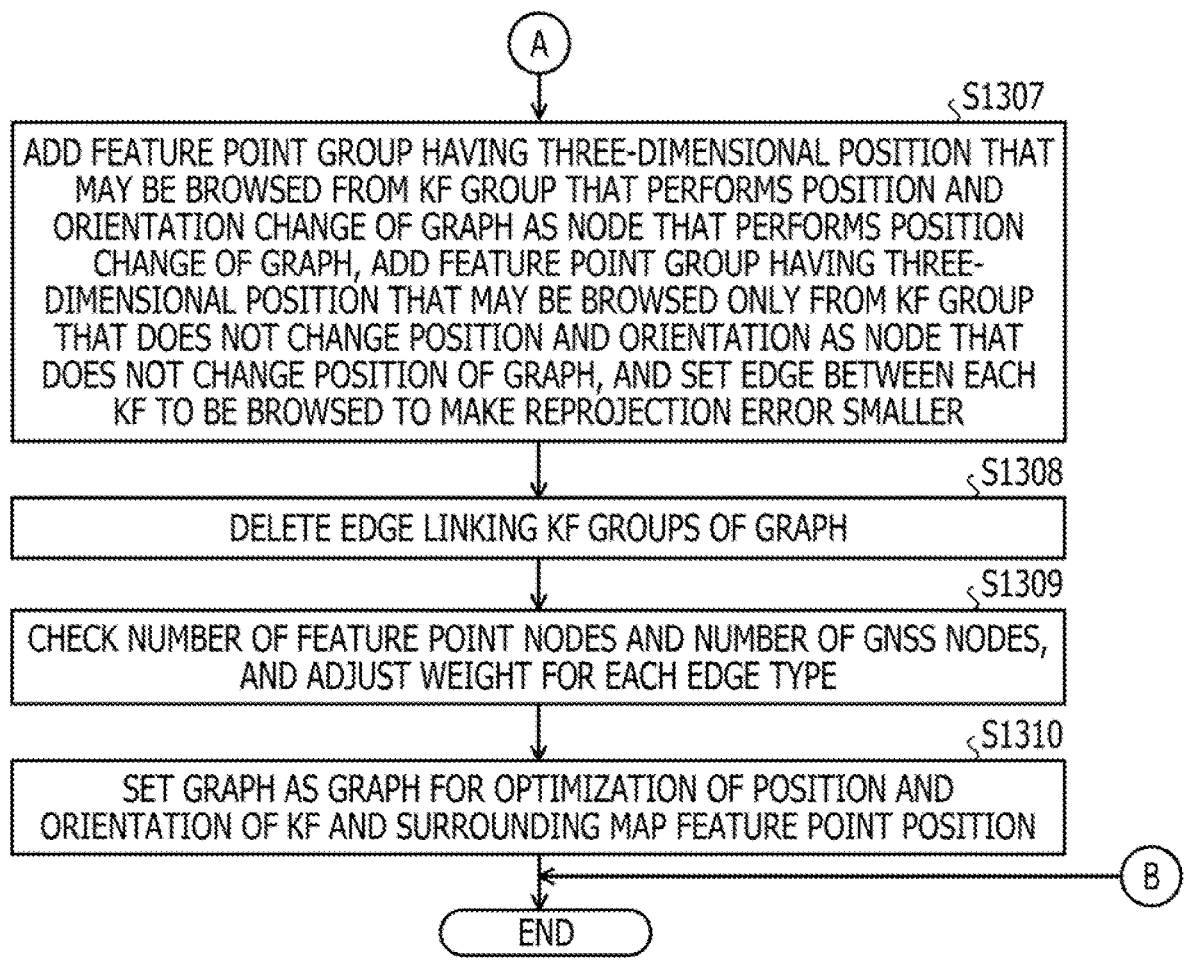

FIGS. 13A and 13B are a flowchart illustrating an example of a processing procedure of the graph restriction generating unit. In the flowchart of FIGS. 13A and 13B, first, it is determined whether the new KF has the GNSS position and there is another KF (step S1301). In this example, only when there is a GNSS position in the new KF and there is another KR Since other than the above is not targeted, if there is no GNSS position in the new KF or there is no other KF (step S1301: No), the series of processing is ended without doing anything.

Although there is not much effect to perform optimization, even if the new KF does not have GNSS position, when it is desired to optimize the KF group and the surrounding feature point group using GNSS information, in step S1301, it is only required to determine whether there is another KF.

In step S1301, if the new KF has the GNSS position and there is another KF (step S1301: Yes), the new KF is registered as a node in the pose graph (step S1302). KF groups sharing feature points with the new KF are added to the pose graph as nodes that may change the position and orientation, and as the number of shared feature points increases, an edge that maintains a strong relative position and orientation is set between KFs that share feature point groups (step S1303).

Next, among the KFs not in the pose graph, the KFs whose time difference with the new KF is within the threshold are added to the pose graph as a node that does not change the position and orientation, and among the other registered KFs, as the number of shared feature points and the number of shared feature points having the largest number of shared feature points is larger, an edge is set that keeps the relative position and orientation stronger (step S1304).

If there is a GNSS position in each KF, the GNSS position is added as a node linked to the KF, between the GNSS position and the KF, set an edge where the position difference between the GNSS position and the KF becomes smaller (step S1305), and the pose graph is set as a graph for optimizing the position and orientation of the KF group (first pose graph) (step S1306).

Next, a feature point group having a three-dimensional position that may be browsed from the KF group that performs position and orientation change of the pose graph is added as a node that performs position change of the pose graph, a feature point group with a 3D position that may be browsed only from the KF group that does not change the position and orientation is added as a node that does not change the position of the pose graph, and an edge is set between each KF to be browsed to make the reprojection error smaller (step S1307). An edge linking the KF groups of the pose graph is deleted (step S1308). The number of feature point nodes and the number of GNSS nodes are checked, and the weight for each edge type is adjusted (step S1309). The pose graph is set as a graph (second pose graph) for optimization of the position and orientation of the KF and the surrounding map feature point position (step S1310), and the series of processing is ended.

In this manner, the processing of the graph restriction generating unit 532 may generate two new pose graphs (first pose graph and second pose graph). In the flowchart of FIGS. 13A and 13B, the graph is created each time for the sake of clarity, but the existing graph may be updated to create the content.

The KF pose and feature point map optimization unit 533 in charge of the environmental map creation (local mapping) processing function 530 performs general graph optimization calculation using the two new pose graphs newly generated by the graph restriction generating unit 532. The KF pose and feature point map optimization unit 533 performs two optimizations: optimization of the KF position and orientation according to the GNSS position of the KF obtained from the input GNSS information and optimization of 3D position of feature point group around optimized KF group.

The KF pose and feature point map optimization unit 533 may realize its function, for example, by the CPU 601 executing a program stored in the memory 602 illustrated in FIG. 6. For example, the CPU 701 may execute the program stored in the memory 702 illustrated in FIG. 7 to realize the function.

The KF pose and feature point map optimization unit 533 performs position and orientation correction mainly on the image of the subject over the image by performing the BA processing (local BA) in the vicinity of the new KF, as in the V-SLAM of the related art using the position and orientation of the KF group that has been corrected and optimized according to the GNSS position, and the 3D position (actual coordinate environmental map) of the feature point group.

As a result, as the effect of the added new KF, the optimization of the related art using the reprojection error of the feature point of the image is performed to finely adjust the position and orientation after adjusting the adjustment of the position and orientation of the KF group, which is closely related to the new KF, which was taken at a close time to the new KF, and the adjustment of three-dimensional position of feature point group around new KF to the input GNSS information in advance. Therefore, it is possible to output with actual coordinate values in which the problem of the gradual occurrence of scale drift, which is the problem of the V-SLAM of the related art, is solved.

Pose graph generation in the graph restriction generating unit 532 of the present system 500 and the graph optimization processing using the pose graph performed prior to the local BA in the KF orientation and feature point map optimization unit 533 may be performed for all new KFs, but as described above, may be performed only when the new KF has a GNSS position. For example, when some image frames of the input video has the GNSS position, the image with the GNSS position may be positively determined as the KF, as described above, in the KF updating unit 522, only when the section without the GNSS position ends and the GNSS position is newly obtained (steps S1204 and S1205 in FIG. 12), and the correction processing of the actual coordinate environmental map (position and orientation of KF group and 3D position of feature point group) 550 may be performed (step S1301 in FIG. 13A) using the obtained GNSS position without fail.

On the other hand, when the new KF does not have a GNSS position, as in the V-SLAM of the related art, by performing position and orientation estimation based on image feature change, it is possible to omit optimization processing using a useless pose graph when there is no GNSS position, and to perform processing only when it is required. Similarly, when the actual coordinate environmental map 550 is used as an input and there is no input of GNSS information, this processing may be omitted.

Although not required, as described above, if there is input orientation information and there is input orientation information in the KF group, orientation information may be included in a pose graph as GNSS position and used for optimization.

Similar to the V-SLAM of the related art, the loop detection and closing unit 541 in charge of the loop closing processing function 540 compares the image feature amounts of the entire image between the new KF and the KF image group to be held, checks the similarity, and confirms whether the user travels the same place a plurality of times (whether loop occurs) along the traveling route at the time of video acquisition. When it is determined to travel the same place with high similarity, the KF group when traveling at the same place in the corresponding past is set in the "loop KF ID" of the KF group information 551 of the related actual coordinate environmental map 550 to enable mutual reference.

The loop detection and closing unit 541 performs either local BA using the KF group in the vicinity of the new KF or global BA using the entire KF group to the new KF at the time of loop occurrence to adjust the positional relationship of KF when traveling at the same place. The KF group in the vicinity of the new KF may be selected from the shared state of the map feature points or the like, or the shared state with the KF group when traveling at the same place in the past may be used.

The loop detection and closing unit 541 may realize its function, for example, by the CPU 601 executing a program stored in the memory 602 illustrated in FIG. 6. For example, the CPU 701 may execute the program stored in the memory 702 illustrated in FIG. 7 to realize the function.

In the present system 500, the actual coordinate environmental map 550 has been constructed so that scale drift does not occur using the input GNSS information 1002 through each processing described above. Therefore, the loop detection and closing unit 541 mainly for the measure against the scale drift may be omitted.

As described above, in the present embodiment, for arbitrary image frame in the time-series image frames (for example, video 1001), the GNSS information (first imaging position) 1002 of the image frame is acquired by measuring, and a second imaging position of the image frame is estimated from image features of the image frame. Using a constraint condition that minimizes the deviation between the first imaging position and the second imaging position, at least one of the imaging position of the arbitrary image frame, the imaging orientation of the arbitrary image frame, and the estimated 3D position of a feature point extracted in the arbitrary image frame is adjusted.

As described above, it has a V-SLAM function that estimates the position and orientation of the imaging camera in the actual coordinate system of latitude and longitude using GNSS information acquired together with a single camera video, and simultaneously creates an environmental map in the actual coordinate system. As a result, it is possible to estimate the actual coordinate environmental map and camera pose (imaging position and orientation) in the actual coordinate system without scale drift, which is the problem of the V-SLAM of the related art, by partial correction of V-SLAM calculation processing with a small processing cost. Accordingly, highly accurate position estimation may be performed.

For example, since the initialization processing of the present embodiment may normally use the same actual coordinate system derived from the latitude and longitude, instead of the image-dependent local coordinate system used for initialization as in the V-SLAM initialization of the related art, even if tracking fails in the middle of the video, if it is required, initialization may be performed again to continue the processing. As a result, as in the V-SLAM of the related art, it does not create a plurality of environmental maps created with coordinate systems with completely different scales, and camera imaging position and orientation data groups, which were fragmented at each tracking failure.

For example, by performing the processing according to the present embodiment, it is possible to create one long environmental map and camera imaging position and orientation data with the same actual coordinate scale throughout the video (however, only at the tracking-fail place, there is a possibility that the map feature points become slightly sparse and the imaging position and orientation estimation data may be lost).

This long environmental map may be used as input for V-SLAM processing with another video. Even if there is a place where tracking failure occurs because the surrounding buildings are not visible due to the moving object in a certain video, the feature points at the tracking failure point may be compensated by the feature points of the new video, and a more accurate environmental map may be constructed by executing the V-SLAM processing according to the present embodiment of inputting the environmental map including the failure point along with other videos that are not hidden by the moving object.

For example, even at a place where there are frequent occurrences of hiding by moving objects, such as roads with a large amount of travel, it is possible to compensate for the missing part with a plurality of videos without worrying about the hiding in the imaged video according to the present embodiment, and it is possible to create an environmental map with high accuracy.

According to the present embodiment, the actual coordinate environmental map may be created in accordance with the input GNSS information. Once an actual coordinate environmental map is created using data acquired by a vehicle that may acquire GNSS information and video simultaneously with high accuracy, such as a surveying vehicle, and inputting and applying that map, the imaging position and orientation of the video of any ordinary vehicle from which only images can be obtained may be obtained with the same accuracy and the same actual coordinate system as the surveying vehicle at the time of map creation with low cost, without performing map creation processing. As a result, a service using an ordinary vehicle video may be realized regardless of the presence or absence of a GNSS position measurement and recording device, so it is possible to easily collect and utilize more vehicle data.

According to the present embodiment, the orientation may be corrected in addition to the imaging position while automatically adjusting the correction range using both GNSS information (position error from GNSS position) and correctness of the subject's appearance by image analysis (such as reprojection error) by the unique KF selection processing and optimization processing rather than scale-adjusting the imaging position only linearly later. As a result, even in places where the scale changes greatly with the V-SLAM of the related art such as turning left or right, it is possible to estimate the imaging position and orientation with high accuracy using the same actual coordinates (same scale).

Since the weight of GNSS information at the time of this correction may be changed appropriately, it is also possible to perform flexible optimization in which priority is given to the correctness of the subject's appearance by image analysis depending on the reliability of the GNSS information. For example, for data of surveying vehicles that may obtain high-accuracy GNSS information, optimization may be performed with emphasis given to the weight of GNSS information, and for data including low-accuracy GNSS information such as GPS information of an ordinary vehicle, the weight of the GNSS information may be slightly dropped to optimize the image analysis result. As a result, it becomes possible to estimate the imaging position and orientation considering the reliability of GNSS information and create an actual coordinate environmental map.

The position estimation method described in the present embodiment may be realized by executing a prepared program on a computer such as a personal computer or a workstation. The program delivery program is recorded on a computer-readable recording medium such as a hard disk, a flexible disk, a compact disc (CD)-ROM, a magneto-optical disk (MO), a digital versatile disk (DVD), a Universal Serial Bus (USB) memory and the like, and is executed by being read from the recording medium by the computer. The position estimation program may be distributed via a network such as Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A position estimation system comprising:
one or more memories; and
one or more processors coupled to the one or more memories and the one or more processors configured to:
acquire a first imaging position measured at a time of imaging a first image among a plurality of images imaged in time series,
acquire, by using a feature of the first image, a second imaging position of the first image, and
perform, in accordance with a constraint condition that reduces a deviation between the first imaging position and the second imaging position, correction of at least one of the second imaging position or a three-dimensional position of a point included in the first image calculated based on the feature of the first image.

2. The position estimation system according to claim 1, wherein
the acquiring by using the feature of the first image includes acquiring a first imaging orientation of the first image, wherein
the correction includes correcting the first imaging orientation based on the constraint condition that reduces the deviation between the first imaging position and the second imaging position.

3. The position estimation system according to claim 1, wherein the acquiring by using the feature of the first image includes:
extracting a first plurality of feature points included in the first image and a second plurality of feature points included in a second image among the plurality of images,
associating each of the first plurality of feature points with each of the second plurality of feature points, and
calculating the second imaging position based on a position of each of the first plurality of feature points and a position of each of the second plurality of feature points, which are associated with each other, in the first image and the second image respectively.

4. The position estimation system according to claim 1, wherein the acquiring by using the feature of the first image includes an initialization process of determining that an imaging position of each of two images calculated based on features of the two images among the plurality of images is equal to an imaging position measured at a time of imaging each of the two images.

5. The position estimation system according to claim 1, wherein the plurality of images are imaged by an imaging device mounted on a moving object.

6. The position estimation system according to claim 5, wherein the first imaging position is a position of the moving object at the time of imaging the first image based on global navigation satellite system information.

7. The position estimation system according to claim 1, wherein
the one or more processors are configured to determine whether a second image is a correction target in accordance with at least one of a difference between an imaging time of the first image and an imaging time of the second image among the plurality of images, a difference between the first imaging position and a measured third imaging position of the second image, a difference between the second imaging position and the measured third imaging position, or a number of feature points commonly included in the first image and the second image, and
the correction includes correcting, in accordance with the constraint condition that reduces the deviation between the first imaging position and the second imaging position, a fourth imaging position calculated based in a feature of the second image when it is determined that the second image is the correction target.

8. A computer-implemented position estimation method comprising:
acquiring a first imaging position measured at a time of imaging a first image among a plurality of images imaged in time series;
acquire, by using a feature of the first image, a second imaging position of the first image; and
correcting, in accordance with a constraint condition that reduces a deviation between the first imaging position and the second imaging position, at least one of the second imaging position or a three-dimensional position of a point included in the first image calculated based on the feature of the first image.

9. The position estimation method according to claim 8, wherein
the acquiring by using the feature of the first image includes acquiring a first imaging orientation of the first image, wherein
the correcting includes correcting the first imaging orientation based on the constraint condition that reduces the deviation between the first imaging position and the second imaging position.

10. The position estimation method according to claim 8, wherein the acquiring by using the feature of the first image includes:
extracting a first plurality of feature points included in the first image and a second plurality of feature points included in a second image among the plurality of images,
associating each of the first plurality of feature points with each of the second plurality of feature points, and
calculating the second imaging position based on a position of each of the first plurality of feature points and a position of each of the second plurality of feature points, which are associated with each other, in the first image and the second image respectively.

11. The position estimation method according to claim 8, wherein the acquiring by using the feature of the first image includes an initialization process of determining that an imaging position of each of two images calculated based on features of the two images among the plurality of images is equal to an imaging position measured at a time of imaging each of the two images.

12. The position estimation method according to claim 8, wherein the plurality of images are imaged by an imaging device mounted on a moving object.

13. The position estimation method according to claim 12, wherein the first imaging position is a position of the moving object at the time of imaging the first image based on global navigation satellite system information.

14. The position estimation method according to claim 8, further comprising:
determining whether a second image is a correction target in accordance with at least one of a difference between an imaging time of the first image and an imaging time of the second image among the plurality of images, a difference between the first imaging position and a measured third imaging position of the second image, a difference between the second imaging position and the measured third imaging position, or a number of feature points commonly included in the first image and the second image,
wherein the correcting includes correcting, in accordance with the constraint condition that reduces the deviation between the first imaging position and the second imaging position, a fourth imaging position calculated based on a feature of the second image when it is determined that the second image is the correction target.

15. A non-transitory computer-readable medium storing instructions executable by one or more computers, the instructions comprising:
one or more instructions for acquiring a first imaging position measured at a time of imaging a first image among a plurality of images imaged in time series;
one or more instructions for acquiring by using a feature of the first image, a second imaging position of the first image; and
one or more instructions for correcting, in accordance with a constraint condition that reduces a deviation between the first imaging position and the second imaging position, at least one of the second imaging position or a three-dimensional position of a point included in the first image calculated based on the feature of the first image.

* * * * *